US009476709B2

(12) United States Patent
Fukushima et al.

(10) Patent No.: US 9,476,709 B2
(45) Date of Patent: Oct. 25, 2016

(54) CALIBRATION APPARATUS, CALIBRATION METHOD, AND MANUFACTURING METHOD FOR AN ELECTRONIC DEVICE

(75) Inventors: Noriyuki Fukushima, Tokyo (JP); Hiroshi Osawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 1264 days.

(21) Appl. No.: 13/291,217

(22) Filed: Nov. 8, 2011

(65) Prior Publication Data

US 2012/0130667 A1    May 24, 2012

(30) Foreign Application Priority Data

Nov. 24, 2010  (JP) ................................. 2010-261785

(51) Int. Cl.
| | | |
|---|---|---|
| G01C 25/00 | (2006.01) | |
| G06F 19/00 | (2011.01) | |
| G01C 19/00 | (2013.01) | |
| G01P 21/00 | (2006.01) | |

(52) U.S. Cl.
CPC .............. G01C 19/00 (2013.01); G01C 25/00 (2013.01); *G01P 21/00* (2013.01)

(58) Field of Classification Search
CPC ....... G01P 15/08; G01P 21/00; G01C 19/00; G01C 25/00; G01C 17/38; G01C 19/56
USPC .......................................... 702/86, 104, 145
See application file for complete search history.

(56) References Cited

U.S. PATENT DOCUMENTS

| 5,665,215 A | 9/1997 | Bussmann | |
|---|---|---|---|
| 7,748,250 B2 | 7/2010 | Kamiya | |
| 2007/0277586 A1* | 12/2007 | Kamiya | ........................ 73/1.38 |
| 2009/0115724 A1 | 5/2009 | Yamamoto | |
| 2011/0066392 A1* | 3/2011 | Judd | .............................. 702/93 |

FOREIGN PATENT DOCUMENTS

| CN | 1888385 A | 1/2007 |
|---|---|---|
| CN | 101029833 A | 9/2007 |

(Continued)

OTHER PUBLICATIONS

Ideal-aerosmith, 1573P datasheet, Oct. 3, 2010.*

(Continued)

*Primary Examiner* — Alexander Satanovsky
*Assistant Examiner* — Ivan Rabovianski
(74) *Attorney, Agent, or Firm* — Matthew B. Dernier, Esq.

(57) ABSTRACT

Provided is a calibration apparatus, including: a holder for fixing an electronic device; a first motor for rotating the holder with a first rotation axis as a center; a second motor for rotating the holder with a second rotation axis perpendicular to the first rotation axis as a center; and a stopper for restricting a rotational position of the holder about the second rotation axis to a range between a reference position and a perpendicular position reached by rotating the holder by 90 degrees from the reference position, in which the first motor rotates the holder to which the electronic device is fixed at a predetermined speed in each of states in which the rotational position of the holder about the second rotation axis falls in the reference position and in which the rotational position of the holder about the second rotation axis falls in the perpendicular position.

8 Claims, 16 Drawing Sheets

(56) References Cited

FOREIGN PATENT DOCUMENTS

| | | | |
|---|---|---|---|
| CN | 101246024 | A | 8/2008 |
| CN | 101545789 | A | 9/2009 |
| CN | 101629969 | A | 1/2010 |
| JP | 61230331 | A | 10/1986 |
| JP | 298532 | A | 4/1990 |
| JP | 2098532 | A | 10/1990 |
| JP | 4142089 | A | 5/1992 |
| JP | 2005017028 | A | 1/2005 |
| JP | 2007322337 | A | 12/2007 |
| JP | 4142089 | A | 8/2008 |
| JP | 2009220091 | A | 10/2009 |
| JP | 2009301531 | A | 12/2009 |
| JP | 2010117371 | A | 5/2010 |

OTHER PUBLICATIONS

Japanese Office Action for corresponding JP application 2010-261785, dated Mar. 26, 2013.
1573P Series Three-Axis Position and Rate Table System, [online], <http://www.ideal-aerosmith.com/motion/1573P.aspx>, 2010, [retrieved on Oct. 25, 2010].
Office Action for corresponding Chinese patent application 201110377210.9, dated Oct. 16, 2014.
Office Action for corresponding Chinese patent application 201110377210.9, dated Feb. 7, 2014.
Japanese Office Action for corresponding JP application 2010-261785, dated Dec. 11, 2012.

* cited by examiner

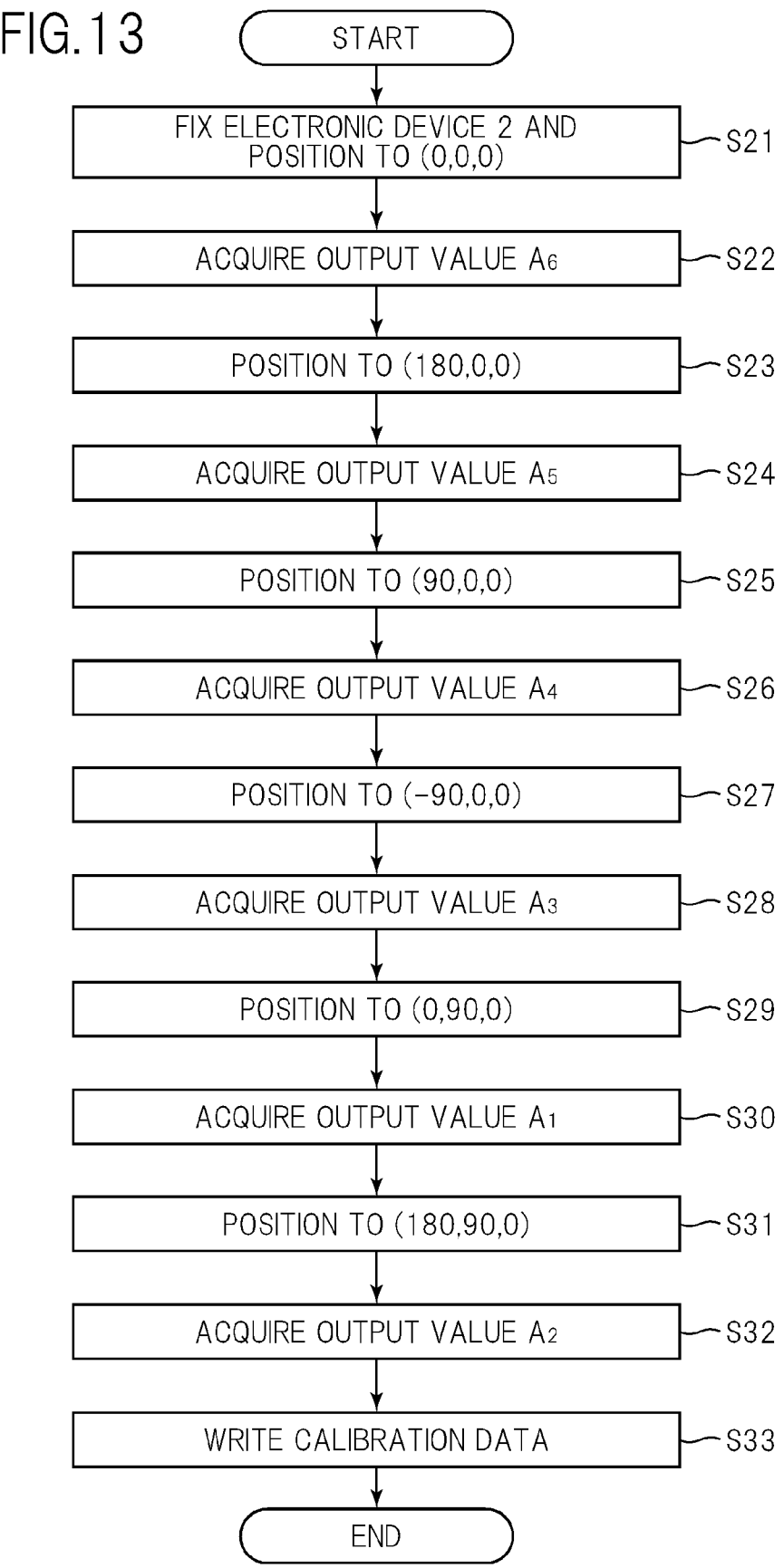

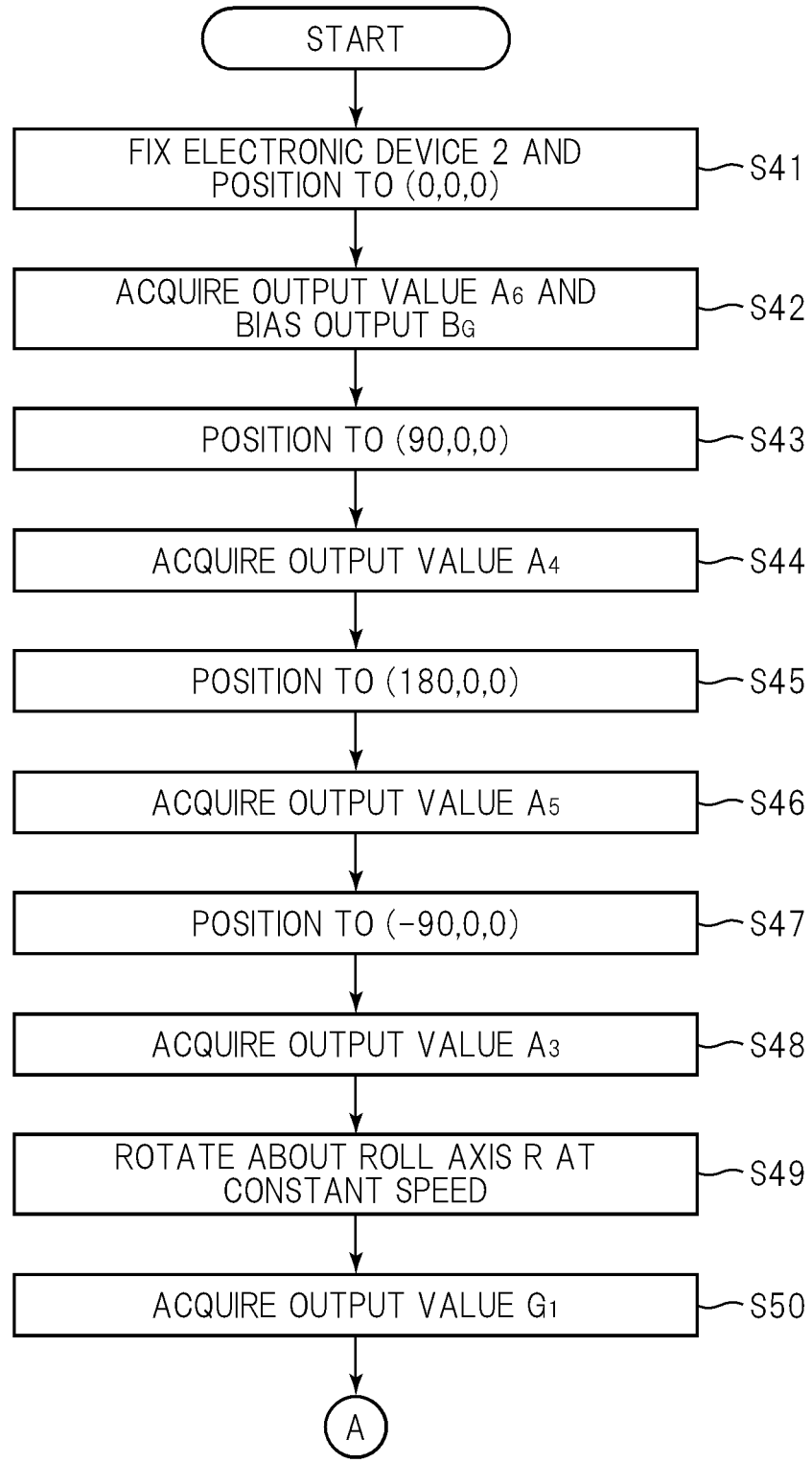

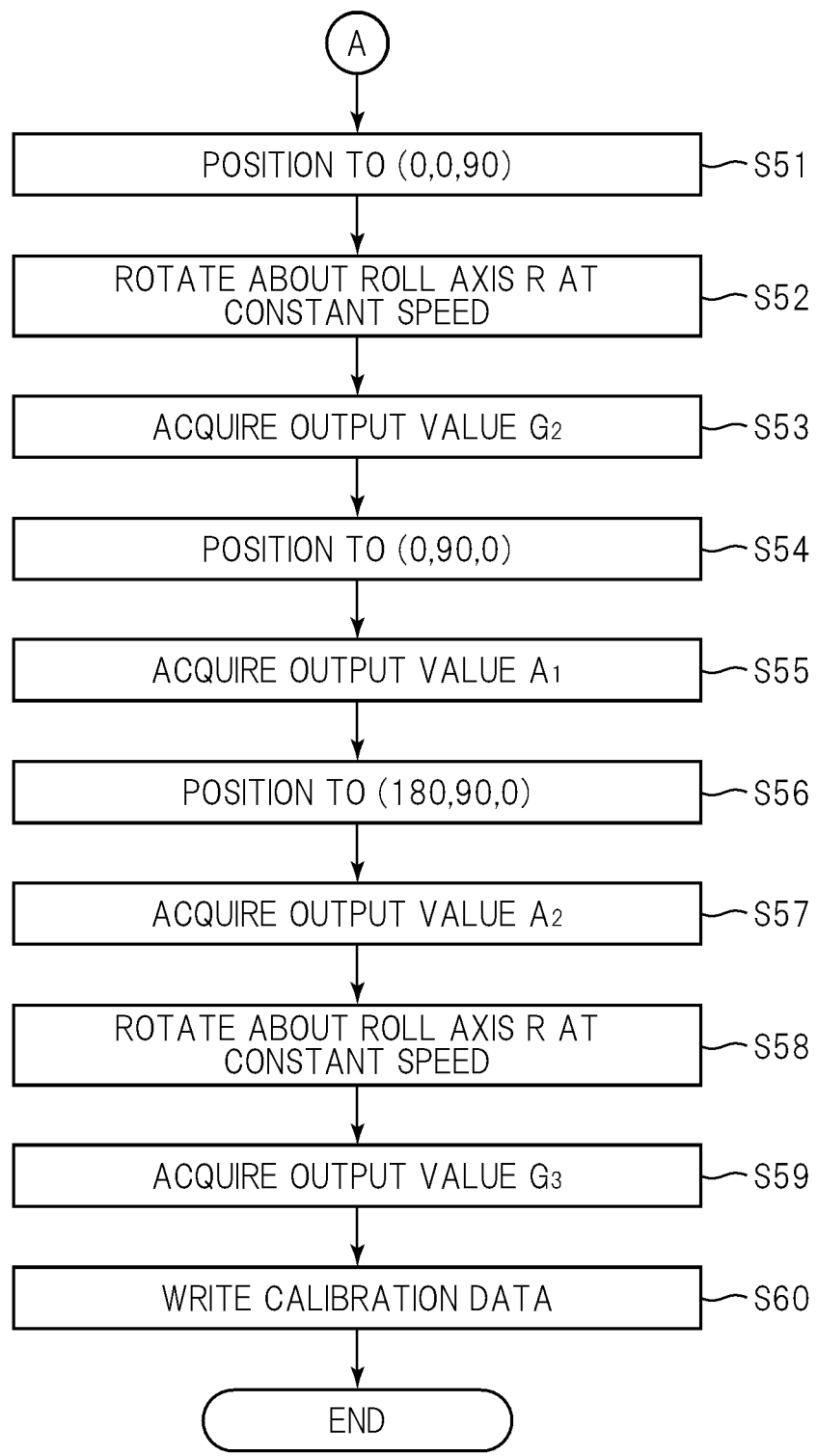

CALIBRATION APPARATUS, CALIBRATION METHOD, AND MANUFACTURING METHOD FOR AN ELECTRONIC DEVICE

BACKGROUND OF THE INVENTION

1. Field of the Invention

The present invention relates to a calibration apparatus to be used for a calibration of a sensor for detecting a rotational speed, a calibration method for the sensor, and a manufacturing method for an electronic device which uses the calibration method.

2. Description of the Related Art

There have been proposed various electronic devices, such as a cellular phone and a controller of a consumer game machine, which are provided with a sensor (such as a gyroscope) for detecting a rotational speed. According to such electronic devices, when a user performs an action such as changing an orientation of the electronic device, it is possible to detect the action by using an output from the sensor.

With regard to the sensor, individual sensors have different output characteristics due to individual differences therebetween. Therefore, a calibration for examining the output characteristic of the sensor is performed on the individual electronic devices incorporating the sensor at the time of factory shipment or other such occasions. Specifically, for example, in a case of a three-axis gyroscope for detecting an angular velocity of rotation with each of three reference axes perpendicular to one another used as a center, the calibration is performed by causing the electronic device to rotate with each of those reference axes as the center at a fixed rotational speed and acquiring an output value of the gyroscope. To perform such a calibration, there is proposed a calibration apparatus that can hold the electronic device and cause the electronic device to rotate at a constant speed (see, for example, "1573P Series Three-Axis Position and Rate Table System", [online], 2010, [retrieved on Oct. 25, 2010], the Internet <http://www.ideal-aerosmith.com/motion/1573P.aspx> (hereinafter, referred to as "Non-patent Document 1")).

In a case where the above-mentioned calibration apparatus is provided with only one motor that can cause the electronic device to rotate at a constant rotational speed, in order to perform a calibration of the sensor in terms of each of a plurality of reference axes thereof, a measurement needs to be performed by the following procedure. That is, the measurement is repeatedly performed a plurality of times while changing the orientation with which the electronic device is fixed to the calibration apparatus such that a rotation axis of the rotation caused by a motor coincides with each of the plurality of reference axes of the sensor. However, it takes much time and labor to perform the measurement a plurality of times while the electronic device is thus fixed to the calibration apparatus again and again. Meanwhile, as in Non-patent Document 1, in the case where the calibration apparatus is provided with a plurality of motors that can cause the electronic device to rotate at the constant rotational speed, if the electronic device is fixed to the calibration apparatus with such an orientation that the plurality of reference axes of the sensor coincide with a plurality of rotation axes of the calibration apparatus, without fixing the electronic device again thereafter, it is possible to cause the electronic device to rotate with each of the plurality of rotation axes as the center at the constant rotational speed and perform the calibration. However, such a motor that can realize control of the rotation at the constant rotational speed with high precision tends to be more expensive and larger in scale than the motor that cannot perform such control, and hence providing such a plurality of motors leads to an increase in production cost of the calibration apparatus and an increase in scale of the calibration apparatus.

SUMMARY OF THE INVENTION

The present invention has been made in view of the above-mentioned circumstances, and an object thereof is to provide a calibration apparatus for a sensor which can cause an electronic device to rotate with each of a plurality of reference axes as a rotation center at a constant speed while reducing the number of motors that can realize control of rotation at a constant rotational speed to a value smaller than the number of reference axes for which rotational speeds are detected by the sensor, a calibration method for a sensor, and a manufacturing method for an electronic device which uses the calibration method.

According to the present invention, there is provided a calibration apparatus, which causes an electronic device including a sensor for detecting a rotational speed with each of a plurality of reference axes as a center to rotate for a calibration of the sensor, the calibration apparatus including: a holder for fixing the electronic device thereto; a first motor for causing the holder to rotate at a predetermined rotational speed with a predetermined first rotation axis as the center; a second motor for causing the holder to rotate with a second rotation axis perpendicular to the predetermined first rotation axis as the center; and a second rotation axis stopper for restricting a rotational position of the holder about the second rotation axis to a range between a second rotation axis reference position and a second rotation axis perpendicular position reached by rotating the holder by 90 degrees from the second rotation axis reference position, in which the first motor causes the holder to which the electronic device is fixed to rotate at the predetermined rotational speed in each of states in which the rotational position of the holder about the second rotation axis falls in the second rotation axis reference position and in which the rotational position of the holder about the second rotation axis falls in the second rotation axis perpendicular position.

The calibration apparatus may further include: a third motor for causing the holder to rotate with a third rotation axis perpendicular to the second rotation axis; and a third rotation axis stopper for restricting a rotational position of the holder about the third rotation axis to a range between a third rotation axis reference position and a third rotation axis perpendicular position reached by rotating the holder by 90 degrees from the third rotation axis reference position, in which the first motor may cause the holder to which the electronic device is fixed to rotate at the predetermined rotational speed in each of states in which the rotational position of the holder about the third rotation axis falls in the third rotation axis reference position and in which the rotational position of the holder about the third rotation axis falls in the third rotation axis perpendicular position.

Further, the calibration apparatus may further include a lock control portion for fixing the holder so as to prevent the holder from rotating about the second rotation axis in the each of the states in which the rotational position of the holder about the second rotation axis falls in the second rotation axis reference position and in which the rotational position of the holder about the second rotation axis falls in the second rotation axis perpendicular position.

Further, in the calibration apparatus, the electronic device may further include an acceleration sensor for detecting a magnitude of a gravitational acceleration applied to each of three reference axes that are perpendicular to one another, and the first motor may position a rotational position of the holder to which the electronic device is fixed about the predetermined first rotation axis to an orientation in which each of two reference axes of the three reference axes coincides with a vertical direction in the state in which the rotational position of the holder about the second rotation axis falls in the second rotation axis reference position, and may position the rotational position of the holder about the predetermined first rotation axis to an orientation in which one reference axis other than the two reference axes among the three reference axes coincides with the vertical direction in the state in which the rotational position of the holder about the second rotation axis falls in the second rotation axis perpendicular position.

Further, according to the present invention, there is provided a calibration method, which is performed for a sensor for detecting a rotational speed with each of a plurality of reference axes as a center by using a calibration apparatus for causing an electronic device including the sensor to rotate with a first rotation axis and a second rotation axis which are perpendicular to each other as centers, the calibration method including: a first step of causing a holder to which the electronic device is fixed to rotate about the first rotation axis at a predetermined rotational speed and acquiring an output value of the sensor that is rotating, in a state in which a rotational position of the electronic device about the second rotation axis falls in a predetermined second rotation axis reference position; a second step of positioning the rotational position of the electronic device about the second rotation axis to a second rotation axis perpendicular position reached by rotating the holder by 90 degrees from the predetermined second rotation axis reference position; a third step of causing the holder to rotate about the first rotation axis at the predetermined rotational speed and acquiring an output value of the sensor that is rotating, in a state in which the rotational position of the electronic device about the second rotation axis falls in the second rotation axis perpendicular position; and a fourth step of calculating calibration data on the sensor by using the output values of the sensor acquired in the first step and the third step.

Further, according to the present invention, there is provided a manufacturing method for an electronic device including a sensor for detecting a rotational speed with each of a plurality of reference axes as a center, the manufacturing method including writing calibration data calculated by the calibration method to a nonvolatile memory provided to the electronic device.

BRIEF DESCRIPTION OF THE DRAWINGS

In the accompanying drawings:

FIG. 13 is a diagram illustrating a procedure for the calibration of an acceleration sensor;

FIG. 14A is a diagram illustrating a procedure for performing both the calibrations of the gyroscope and the acceleration sensor at one time; and FIG. 14B is a diagram illustrating the procedure for performing both the calibrations of the gyroscope and the acceleration sensor at one time.

DETAILED DESCRIPTION OF THE INVENTION

Hereinafter, an embodiment of the present invention is described in detail with reference to the accompanying drawings.

Figure 1:
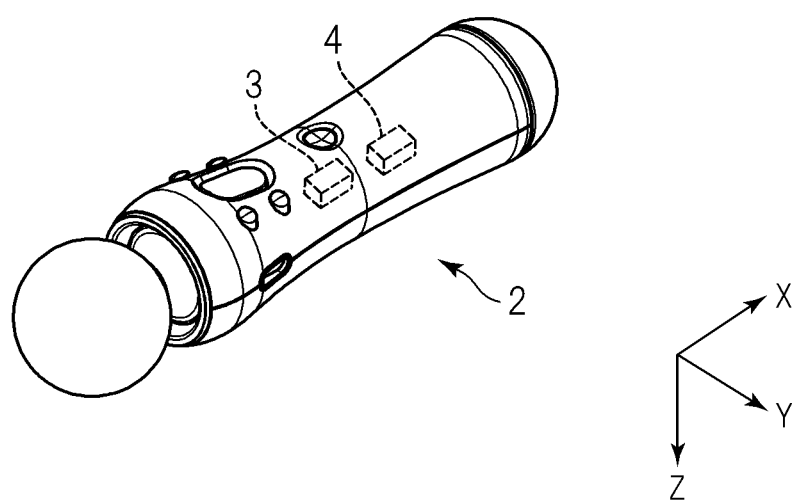
FIG. 1 is a perspective view illustrating an example of an external appearance of an electronic device to be subjected to a calibration by a calibration apparatus according to an embodiment of the present invention.

FIG. 1 is a perspective view illustrating an example of an external appearance of an electronic device 2 to be subjected to a calibration by a calibration apparatus 1 according to the embodiment of the present invention. In this embodiment, the electronic device 2 incorporates a gyroscope 3 and an acceleration sensor 4, and the calibration apparatus 1 acquires sensor output values necessary for calibrations of the gyroscope 3 and the acceleration sensor 4 while changing a posture of the electronic device 2. Here, the electronic device 2 is assumed as a controller of a consumer game machine as an example, but the present invention is not limited thereto, and the electronic device 2 may be any kind of device incorporating a sensor for detecting the posture and movement of the device, such as, for example, a portable game machine or a cellular phone.

The gyroscope 3 is a kind of sensor for detecting a rotational speed of the electronic device 2. In this embodiment, the gyroscope 3 is assumed as a three-axis gyroscope. Specifically, the gyroscope 3 detects angular velocities of rotation with three reference axes perpendicular to one another each used as a rotation center, and outputs three output values indicating the detection results.

Further, the acceleration sensor 4 is a sensor for detecting an acceleration generated in the electronic device 2. The acceleration sensor 4 functions as a sensor for detecting an inclination of the electronic device 2 with respect to a vertical direction by detecting a gravitational acceleration. In this embodiment, the acceleration sensor 4 is a three-axis acceleration sensor. Specifically, the acceleration sensor 4 detects magnitudes of acceleration generated in respective directions parallel with the three reference axes that are perpendicular to one another, and outputs three output values indicating the detection results.

In this embodiment, it is assumed that the three reference axes of the gyroscope 3 and the three reference axes of the acceleration sensor 4 coincide with each other. Specifically, the gyroscope 3 and the acceleration sensor 4 are arranged inside a casing of the electronic device 2 such that each set of the three reference axes coincides with a height direction (hereinafter, referred to as "X-axis direction"), a width direction (hereinafter, referred to as "Y-axis direction"), and a depth direction (hereinafter, referred to as "Z-axis direction") of the electronic device 2.

Figure 2:
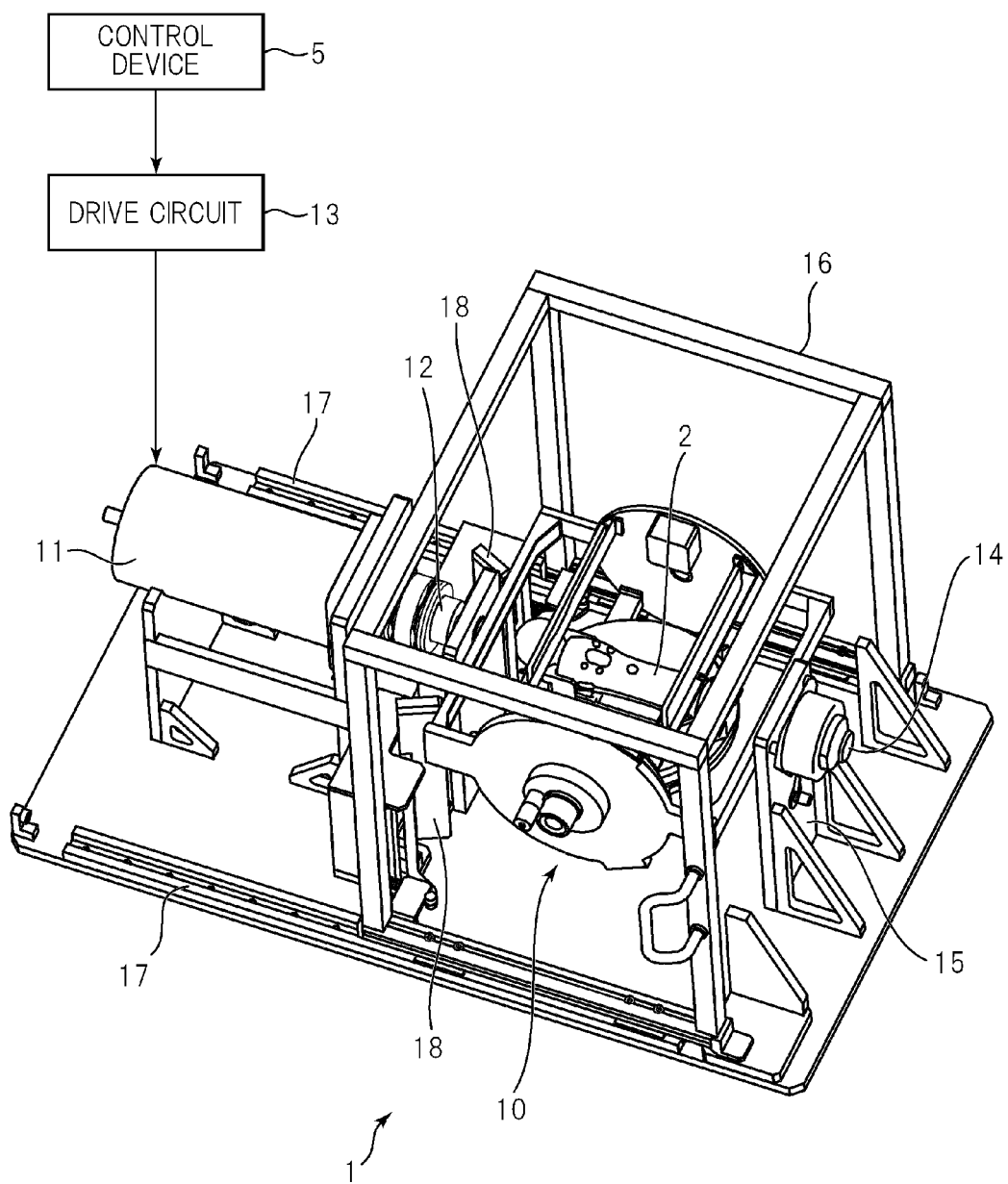
FIG. 2 is a perspective view illustrating an external appearance of the calibration apparatus according to the embodiment of the present invention.

FIG. 2 is a perspective view illustrating an external appearance of the calibration apparatus 1. As illustrated in FIG. 2, the calibration apparatus 1 includes a stage unit 10 to which the electronic device 2 is to be fixed, a main shaft motor 11, a mechanical coupling 12, a drive circuit 13, a rotary encoder 14, a support portion 15, a hatch 16, rails 17, and lever arms 18. Further, the calibration apparatus 1 is connected to a control device 5 for controlling an operation of the calibration apparatus 1.

The main shaft motor 11 performs such drive control as to cause an entirety of the stage unit 10 to rotate with a predetermined rotation axis (hereinafter, referred to as "roll axis R") as a center. The main shaft motor 11 is, for example, a stepping motor, an AC servo motor, or a DC servo motor, and its rotating shaft is coupled to the stage unit 10 via the mechanical coupling 12. The main shaft motor 11 performs constant speed rotation control for causing the stage unit 10 to rotate at a constant rotational speed according to a drive signal output by the drive circuit 13. Further, the main shaft motor 11 performs a positioning control for adjusting a rotational position of the stage unit 10 about the roll axis R (hereinafter, referred to as "roll axis rotational position") to a predetermined position according to the drive signal output by the drive circuit 13. Note that, the calibration apparatus 1 is placed so that the roll axis R is parallel with a horizontal plane.

The drive circuit 13 outputs drive signals for driving the main shaft motor 11, a pan axis motor 30 described later, and a tilt axis motor 40 described later to the respective motors based on a control signal from the control device 5.

The rotary encoder 14 measures in real time a rotation angle and a rotational speed of the stage unit 10 about the roll axis R which are generated by the main shaft motor 11. By feeding back measurement results from the rotary encoder 14 to the drive circuit 13, it is possible to allow the drive circuit 13 to precisely perform the constant speed rotation control for causing the main shaft motor 11 to rotate the stage unit 10 at a constant rotational speed and the positioning control for adjusting the rotational position of the stage unit 10 to an arbitrary position.

The support portion 15 rotatably supports the stage unit 10 from the other side of a side to which the main shaft motor 11 is connected. Note that, as described later, a through hole 15a is formed in the support portion 15.

The hatch 16, the rails 17, and the lever arms 18 constitute a safety mechanism. The safety mechanism is described later in detail.

The control device 5 is, for example, an information processor such as a personal computer, and executes calibration processing according to a control program stored in a memory thereof. Specifically, the control device 5 outputs the control signal including an instruction to perform an operation for causing the electronic device 2 to rotate, to the drive circuit 13 of the calibration apparatus 1 at a time of execution of the calibration. Contents of the control performed on the calibration apparatus 1 by the control device 5 are described later.

Further, the control device 5 is communicatively connected to the electronic device 2 in a wired or wireless manner, and acquires from the electronic device 2 detection results output respectively from the gyroscope 3 and the acceleration sensor 4 during the execution of the calibration. Then, the control device 5 calculates a correction parameter for correcting the output value from those sensors by using values of the acquired detection results, and performs processing for writing the calculated correction parameter to a nonvolatile memory within the electronic device 2.

Figure 3:
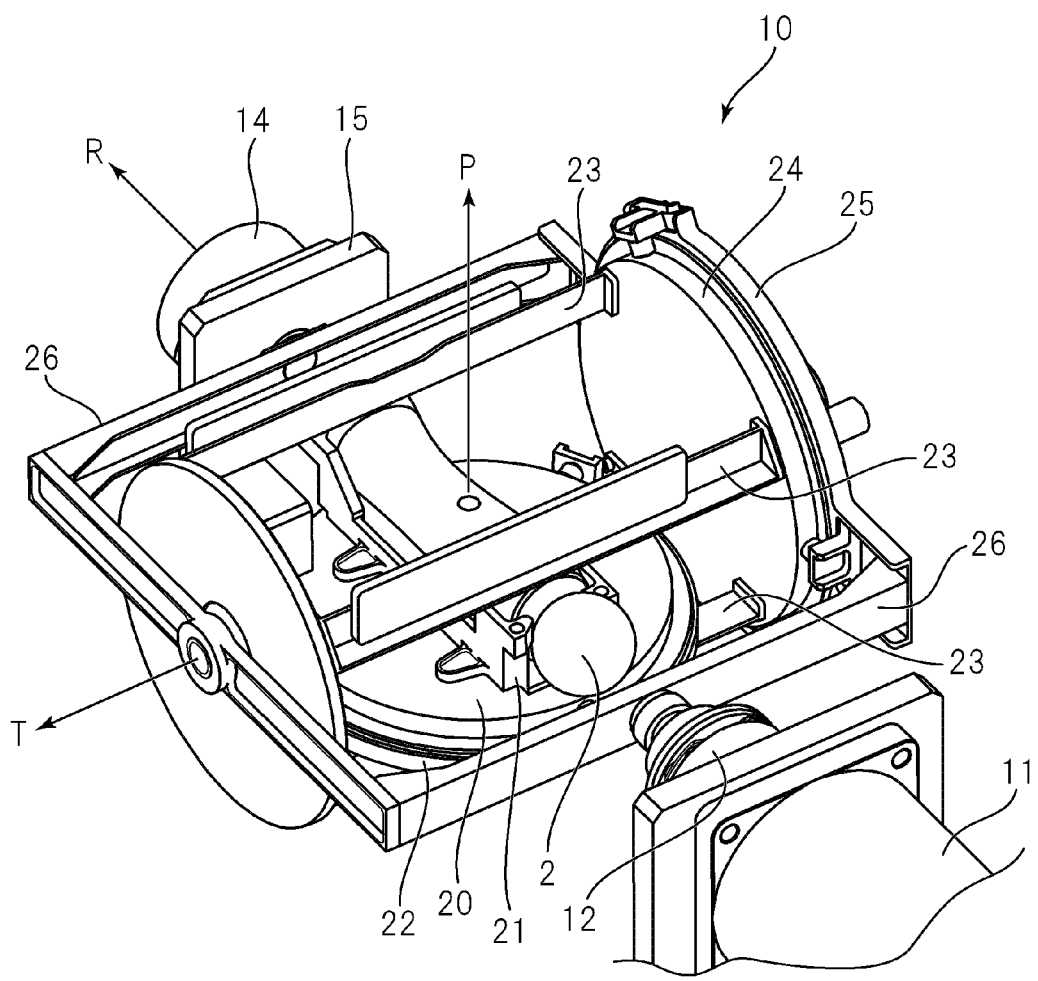
FIG. 3 is a perspective view illustrating a structure of a stage unit.

Next described is a structure of the stage unit 10. As illustrated in FIG. 3, the stage unit 10 includes a stage (holder) 20, a support member 21, a pan axis fixing portion 22, inside arms 23, a tilt axis rotation portion 24, a tilt axis fixing portion 25, and outside arms 26.

The stage 20 has a disc-like shape, and when the calibration is performed, the electronic device 2 is fixed to the stage 20 via the support member 21. Then, the stage 20 is structured so as to rotate with a predetermined rotation axis (hereinafter, referred to as "pan axis P") as a center relative to the pan axis fixing portion 22. In this embodiment, the pan axis P is a rotation axis perpendicular to a top surface of the stage 20 which passes through the center of the top surface of the stage 20.

Further, the pan axis fixing portion 22 has a disc-like shape that is a little larger than the stage 20, and is fixed to the tilt axis rotation portion 24 via the inside arms 23. The tilt axis rotation portion 24 has a disc-like shape similarly to the stage 20, and is structured so as to rotate with a rotation axis (hereinafter, referred to as "tilt axis T") perpendicular to the pan axis P as a center relative to the tilt axis fixing portion 25. The rotation causes the stage 20 to accordingly rotate with the tilt axis T as the center. Note that, the tilt axis T is a rotation axis having an orientation parallel with the top surface of the stage 20.

In addition, the tilt axis fixing portion 25 is connected to two outside arms 26, and the mechanical coupling 12 is attached to one of the outside arms 26. Accordingly, the main shaft motor 11 can cause the entirety of the stage unit 10 to rotate about the roll axis R as described above. Note that, the roll axis R is the rotation axis perpendicular to the tilt axis T. The main shaft motor 11 causes the entirety of the stage unit 10 to rotate, thereby causing the stage 20 to accordingly rotate about the roll axis R.

That is, the stage unit 10 and the main shaft motor 11 constitute a three-axis gimbal mechanism, and hence the calibration apparatus 1 can cause the electronic device 2 fixed to the stage 20 to rotate with each of the pan axis P, the tilt axis T, and the roll axis R as the rotation center. Note that, in this embodiment, in the state in which the top surface of the stage 20 is parallel with the horizontal plane as illustrated in FIGS. 2 and 3, the pan axis P, the tilt axis T, and the roll axis R are perpendicular to one another, and the pan axis P has an orientation along the vertical direction, while the tilt axis T and the roll axis R has an orientation parallel with the horizontal plane.

In addition, in this embodiment, the rotation of the stage 20 with the pan axis P as the rotation center is restricted to a range of 90 degrees. More specifically, a rotational position of the stage 20 with the pan axis P (hereinafter, referred to as "pan axis rotational position") as the rotation center is restricted to a range from a predetermined position assumed as 0 degrees to a position rotated by 90 degrees from the predetermined position toward a predetermined direction. Described below is a structure of the stage 20 and the pan axis fixing portion 22 which allows the above-mentioned restrictions.

Figure 4:
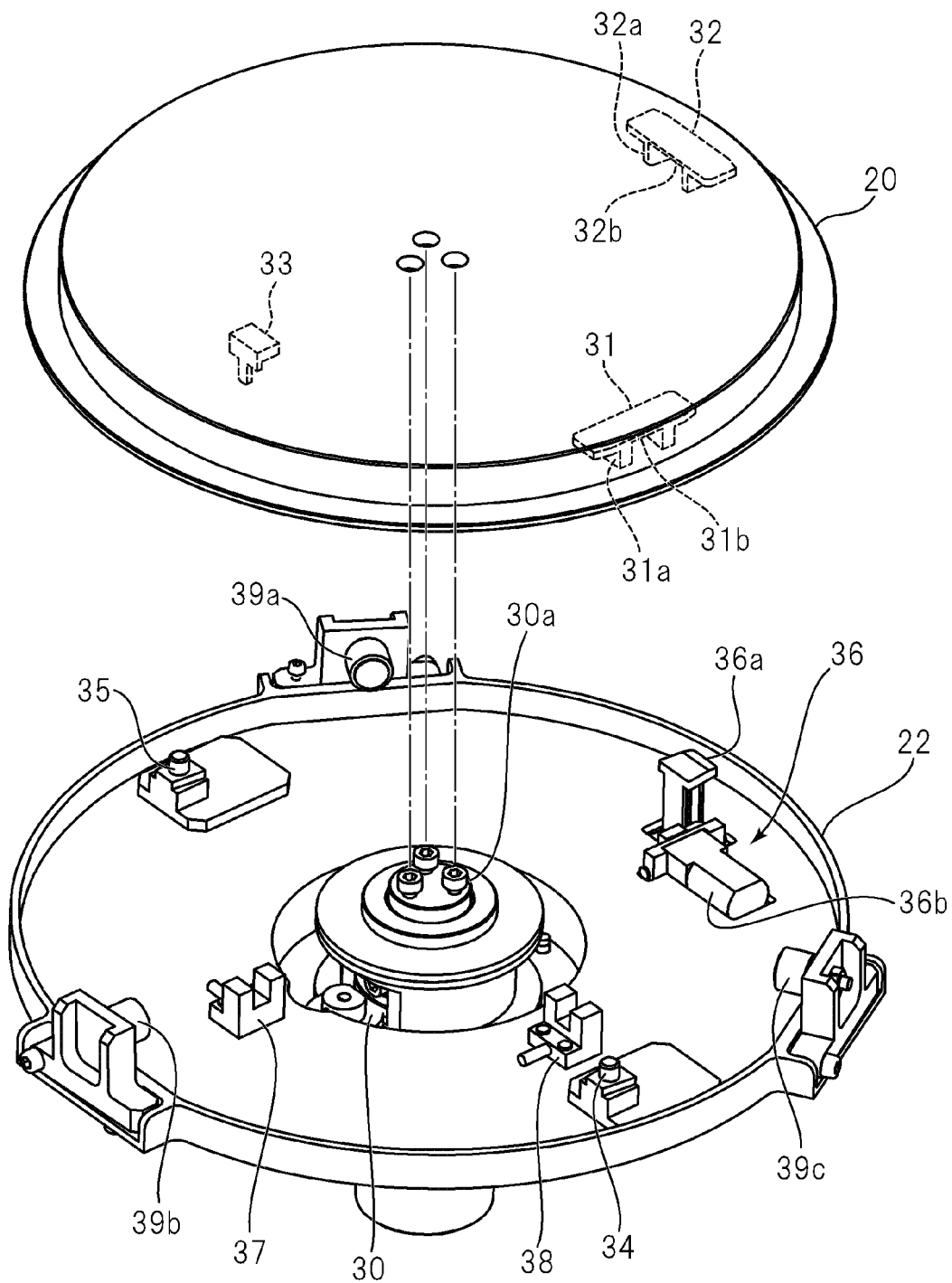
FIG. 4 is an exploded perspective view illustrating a structure of a stage and a pan axis fixing portion.

FIG. 4 is an exploded perspective view illustrating the structure of the stage 20 and the pan axis fixing portion 22. As illustrated in FIG. 4, the pan axis motor 30 is located in the vicinity of the center of the pan axis fixing portion 22, and by its driving force, a rotation axis 30a located at the center position of the pan axis fixing portion 22 is caused to rotate. By having the rotation of the rotation axis 30a transmitted to the stage 20, the stage 20 is caused to rotate with the pan axis P as the rotation center relative to the pan axis fixing portion 22.

Two positioning blocks (hereinafter, referred to as "first pan axis positioning block 31" and "second pan axis positioning block 32") are provided to an undersurface of the stage 20 (that is, surface facing the pan axis fixing portion 22) along its rim so as to protrude from the undersurface. The first pan axis positioning block 31 and the second pan axis positioning block 32 are arranged along the rim of the stage 20 apart from each other by a quarter round so as to form an angle of 90 degrees when viewed from the center of the stage 20. Note that, the first pan axis positioning block 31 and the second pan axis positioning block 32 are provided with key grooves 31b and 32b having a concave tapered shape, respectively. Further, a detection subject 33 is also provided to the undersurface of the stage 20 so as to protrude therefrom.

Meanwhile, two stoppers (hereinafter, referred to as "first pan axis stopper 34" and "second pan axis stopper 35") are provided to a top surface of the pan axis fixing portion 22 (that is, surface facing the stage 20) along its rim so as to protrude from the top surface. The first pan axis stopper 34 and the second pan axis stopper 35 are located along the rim of the pan axis fixing portion 22 so as to substantially form an angle of 180 degrees when viewed from the center of the pan axis fixing portion 22. Further, a lock control portion 36 is located at the midpoint position between the first pan axis stopper 34 and the second pan axis stopper 35 (that is, position that forms an angle of 90 degrees with respect to both the first pan axis stopper 34 and the second pan axis stopper 35) along the rim of the pan axis fixing portion 22. The lock control portion 36 includes a key 36a having a convex tapered shape and a lock motor 36b for driving the key 36a. Further, photo interrupters 37 and 38 are arranged on the top surface of the pan axis fixing portion 22. The photo interrupters 37 and 38 are arranged so as to form an angle of 90 degrees when viewed from the center of the pan axis fixing portion 22, and detect existence of the detection subject 33 when the detection subject 33 reaches each of detection positions of the photo interrupters 37 and 38.

Figure 5A:
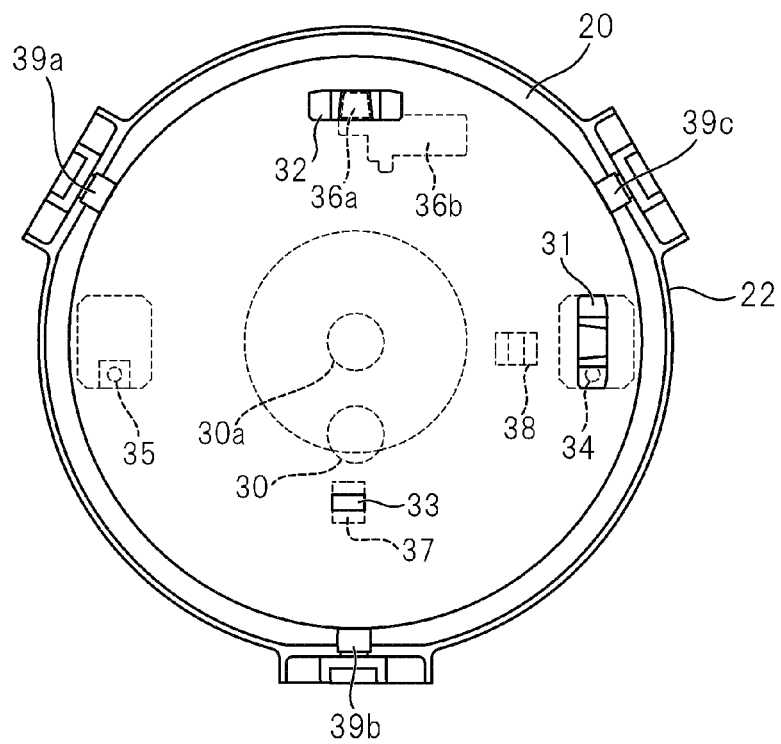
FIG. 5A is a plan view illustrating a positional relationship between positioning blocks and stoppers, which is obtained in a state in which a pan axis rotational position falls in a reference position.

The above-mentioned structure restricts the range that allows the stage 20 to rotate about the pan axis P to a range from 0 degrees to 90 degrees. Specifically, if the pan axis motor 30 causes the stage 20 to keep rotating clockwise when viewed from above the stage 20, a surface 31a of the first pan axis positioning block 31 is brought into abutment against the first pan axis stopper 34, and the stage 20 reaches a state in which the stage 20 cannot further rotate clockwise. Hereinafter, the pan axis rotational position of the stage 20 reaching the state is referred to as a reference position of the pan axis P. Note that, in that state, the detection subject 33 has moved to the detection position of the photo interrupter 37. FIG. 5A is a plan view illustrating a positional relationship between the first pan axis positioning block 31 and second pan axis positioning block 32 and the first pan axis stopper 34 and second pan axis stopper 35, which is obtained in a state in which the pan axis rotational position of the stage 20 falls in the reference position. Here, the first pan axis positioning block 31, the second pan axis positioning block 32, and the detection subject 33 that are arranged on the undersurface side of the stage 20 are indicated by the solid lines in order to clarify the positional relationship thereamong.

Figure 5B:
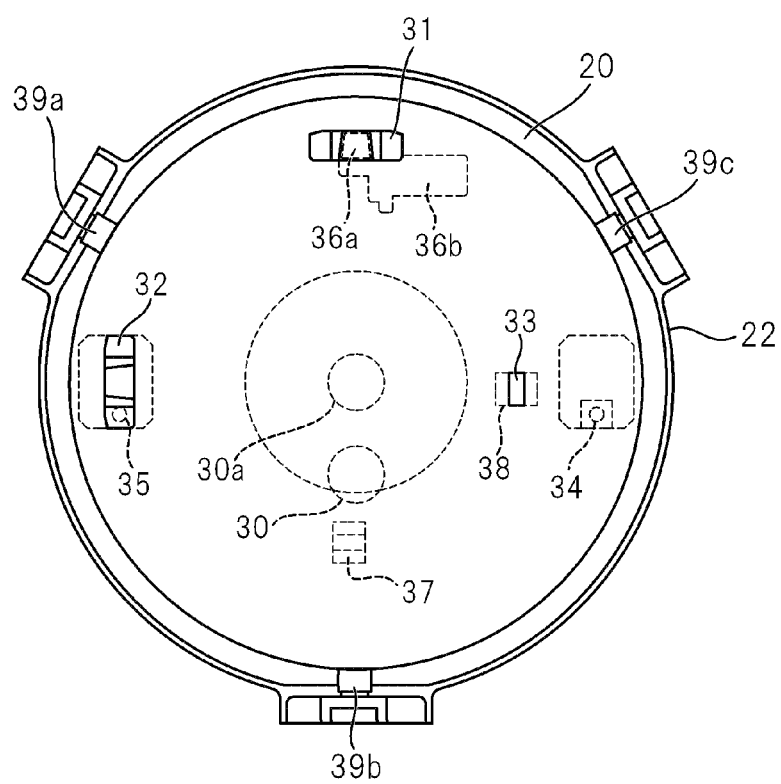
FIG. 5B is a plan view illustrating a positional relationship between the positioning blocks and the stoppers, which is obtained in a state in which the pan axis rotational position falls in a perpendicular position.

If the pan axis motor 30 causes the stage 20 to keep rotating counterclockwise when viewed from above starting from the reference position of the pan axis P, a surface 32a of the second pan axis positioning block 32 is brought into abutment against the second pan axis stopper 35 at a point in time when the stage 20 is caused to rotate by 90 degrees, and the stage 20 reaches a state in which the stage 20 cannot further rotate counterclockwise. Hereinafter, the pan axis rotational position of the stage 20 reaching the state is referred to as a perpendicular position of the pan axis P. Note that, in that state, the detection subject 33 has moved to the detection position of the photo interrupter 38. FIG. 5B is a plan view illustrating a positional relationship between the first pan axis positioning block 31 and second pan axis positioning block 32 and the first pan axis stopper 34 and second pan axis stopper 35, which is obtained in a state in which the pan axis rotational position of the stage 20 falls in the perpendicular position. In FIG. 5B, in the same manner as in FIG. 5A, the first pan axis positioning block 31, the second pan axis positioning block 32, and the detection subject 33 are arranged on the undersurface side of the stage 20 in actuality, but are indicated by the solid lines.

As described above, the first pan axis stopper 34 and the second pan axis stopper 35 regulate the rotation of the stage 20 to thereby mechanically restrict the pan axis rotational position of the stage 20 to the range between the reference position and the perpendicular position, which prevents the stage 20 from rotating about the pan axis P outside the range.

In this embodiment, it is assumed that, during the calibration, the output values of the respective sensors are acquired only in a state in which the pan axis rotational position of the stage 20 falls in one of the reference position and the perpendicular position. That is, in a state in which the pan axis rotational position of the stage 20 falls between the reference position and the perpendicular position during the calibration, the output value of the gyroscope 3 or the acceleration sensor 4 is not used for the calibration. Therefore, there is no need to control the pan axis motor 30 so as to perform the positioning of the pan axis rotational position of the stage 20 with high precision or cause the stage 20 to rotate about the pan axis P at a constant speed. For this reason, in the calibration apparatus 1 according to this embodiment, there is no need to employ a large-scale servo motor or the like as the pan axis motor 30 or locate a rotary encoder or the like for detecting a rotation amount and a rotational speed of the rotation about the pan axis P with high precision.

However, even in this embodiment, it is necessary to precisely perform such positioning that the pan axis rotational position of the stage 20 is set to 0 degrees (reference position) and 90 degrees (perpendicular position). The precision of the positioning depends on machining precision, but as described below, by using the lock control portion 36 to perform lock control for the stage 20, the positioning control can be performed with sufficiently high precision, for example, an angle error of 0.001 or less even as general machining precision.

Figure 6A:
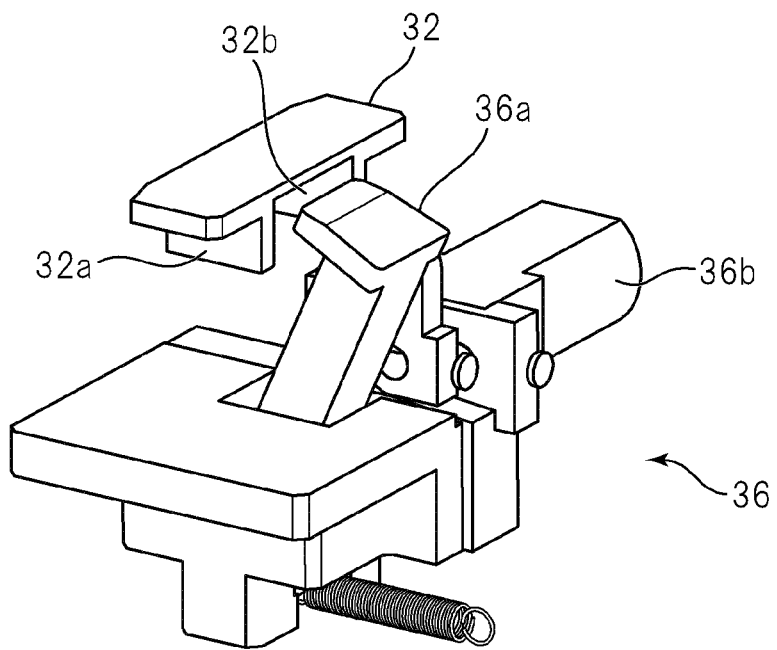
FIG. 6A is a diagram illustrating how a lock control portion operates.
Figure 6B:
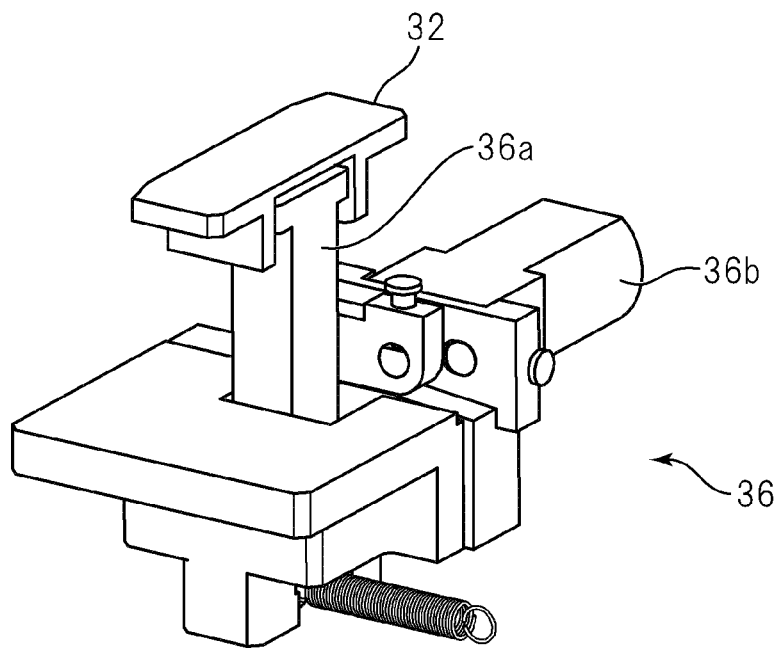
FIG. 6B is a diagram illustrating how the lock control portion operates.

Specifically, in the state in which the pan axis rotational position of the stage 20 falls in the reference position (that is, state in which the first pan axis positioning block 31 is abutted against the first pan axis stopper 34), the secondpan axis positioning block 32 exists in a position corresponding to the lock control portion 36. When the photo interrupter 37 detects the above-mentioned state, the lock motor 36b performs such drive control as to extrude the key 36a. With this control, the key 36a is fitted into the key groove 32b provided to the second pan axis positioning block 32, and hence the rotation of the stage 20 about the pan axis P is regulated. FIGS. 6A and 6B are diagrams illustrating how the lock control portion 36 operates. FIG. 6A illustrates a state before the key 36a is fitted into the key groove 32b (that is, state in which the stage 20 is not fixed), and FIG. 6B illustrates a state in which the key 36a is fitted into the key groove 32b to fix the stage 20. Note that, the key 36a is urged by a spring (not shown) in a direction in which the key 36a is fitted into the key groove 32b, and therefore the key 36a is fitted into the key groove 32b without a wobble.

Further, in the state in which the pan axis rotational position of the stage 20 falls in the perpendicular position (that is, state in which the second pan axis positioning block 32 is abutted against the second pan axis stopper 35), the first pan axis positioning block 31 exists in the position corresponding to the lock control portion 36. In the same manner as in the case of the positioning of the reference position, when the photo interrupter 38 detects the above-mentioned state, the lock motor 36b performs such control as to fit the key 36a into the key groove 31b provided to the first pan axis positioning block 31.

As described above, in both the states in which the pan axis rotational position of the stage 20 falls in the reference position and in the perpendicular position, the lock control portion 36 can suppress a wobble in the stage 20 by locking the stage 20, and hence the positioning can be performed with high precision such that the pan axis rotational position of the stage 20 falls in the reference position and the perpendicular position. In addition, in this embodiment, rollers 39a, 39b, and 39c are arranged in three positions along the rim of the pan axis fixing portion 22, and those rollers 39a, 39b, and 39c press against a side surface of the stage 20. This further prevents the wobble of the stage 20.

In the same manner as the rotation about the pan axis P, the rotation of the stage 20 with the tilt axis T as the rotation center is also regulated to the range of 90 degrees. More specifically, a rotational position of the stage 20 about the tilt axis T (hereinafter, referred to as "tilt axis rotational position") is restricted to a range from a predetermined position assumed as 0 degrees to a position rotated by 90 degrees toward a predetermined direction. In order to realize such restriction, the tilt axis rotation portion 24 and the tilt axis fixing portion 25 have substantially the same structures as the stage 20 and the pan axis fixing portion 22, respectively.

Figure 7:
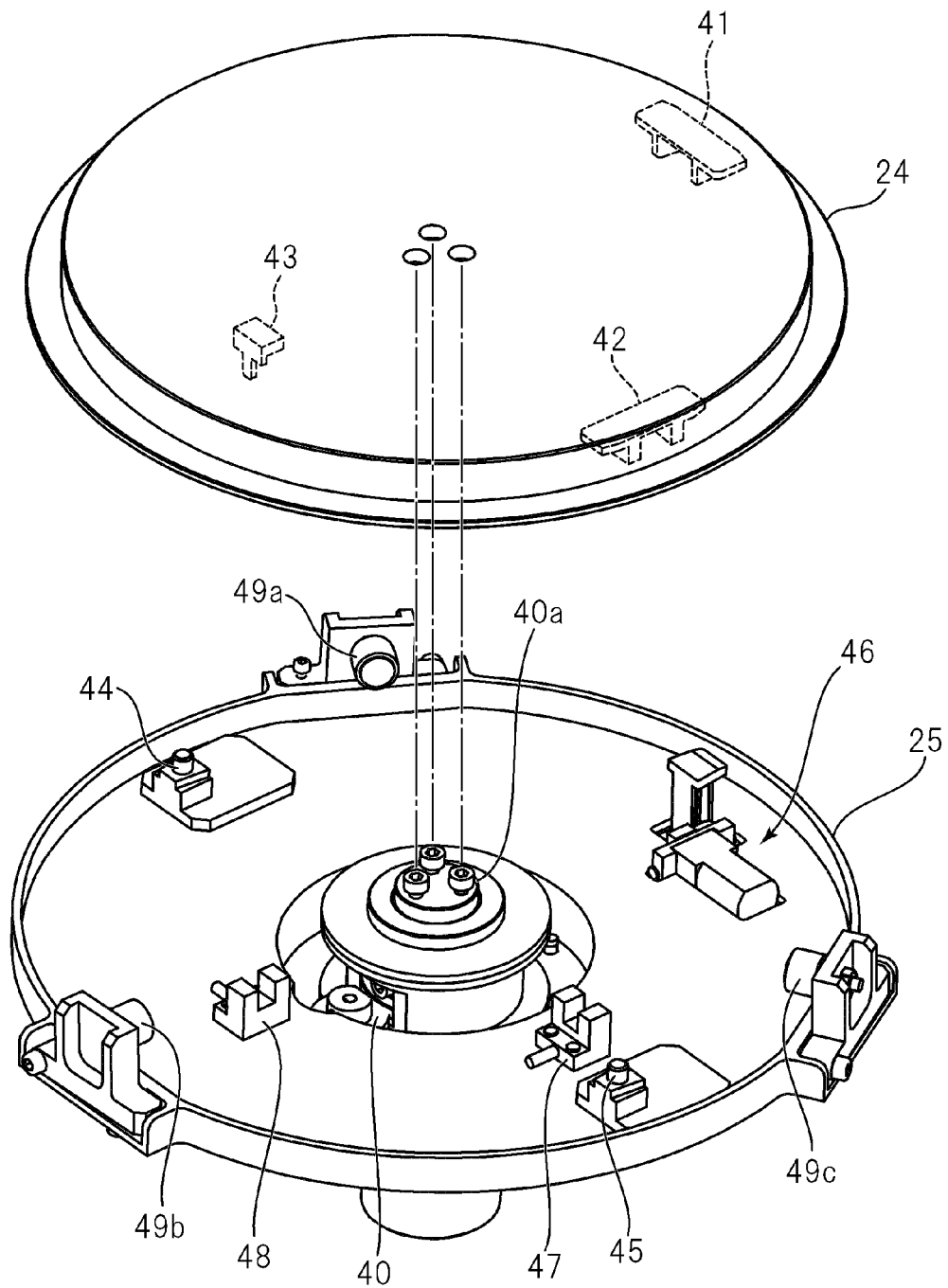
FIG. 7 is an exploded perspective view illustrating a structure of a tilt axis rotation portion and a tilt axis fixing portion.

FIG. 7 is an exploded perspective view illustrating a structure of the tilt axis rotation portion 24 and the tilt axis fixing portion 25. As illustrated in FIG. 7, the tilt axis motor 40 is located in the vicinity of the center of the tilt axis fixing portion 25, and by its driving force, a rotation axis 40a located at the center position of the tilt axis fixing portion 25 is caused to rotate. By having the rotation of the rotation axis 40a transmitted to the tilt axis rotation portion 24, the tilt axis rotation portion 24 is caused to rotate with the tilt axis T as the rotation center relative to the tilt axis fixing portion 25. With this structure, the stage 20 coupled to the tilt axis rotation portion 24 via the pan axis fixing portion 22 and the inside arm 23 is also caused to rotate with the tilt axis T as the rotation center.

Further, two positioning blocks (hereinafter, referred to as "first tilt axis positioning block 41" and "second tilt axis positioning block 42") are provided to a surface of the tilt axis rotation portion 24 which faces the tilt axis fixing portion 25 along its rim so as to protrude from the surface and to form an angle of 90 degrees. Further, a detection subject 43 is also provided to the same surface so as to protrude therefrom. Then, two stoppers (hereinafter, referred to as "first tilt axis stopper 44" and "second tilt axis stopper 45") are provided to a surface of the tilt axis fixing portion 25 which faces the tilt axis rotation portion 24 along its rim so as to protrude from the surface and to be opposed to each other, and a lock control portion 46 is located at the midpoint position between the first tilt axis stopper 44 and the second tilt axis stopper 45 along the rim of the tilt axis fixing portion 25. Further, photo interrupters 47 and 48 are arranged on the surface of the tilt axis fixing portion 25 which faces the tilt axis rotation portion 24 so as to form an angle of 90 degrees when viewed from the center of the tilt axis fixing portion 25.

The above-mentioned structure restricts the range that allows the tilt axis rotation portion 24 to rotate about the tilt axis T to the range from 0 degrees to 90 degrees. Specifically, if the tilt axis motor 40 causes the tilt axis rotation portion 24 to keep rotating counterclockwise when viewed from the stage 20 side, the first tilt axis positioning block 41 is brought into abutment against the first tilt axis stopper 44, and the tilt axis rotation portion 24 reaches a state in which the tilt axis rotation portion 24 cannot further rotate counterclockwise. Hereinafter, the tilt axis rotational position of the stage 20 reaching the state is referred to as a reference position of the tilt axis T. Note that, in this state, the detection subject 43 has moved to the detection position of the photo interrupter 47.

If the tilt axis motor 40 causes the tilt axis rotation portion 24 to keep rotating clockwise when viewed from the stage 20 side starting from the reference position of the tilt axis T, the second tilt axis positioning block 42 is brought into abutment against the second tilt axis stopper 45 at a point in time when the tilt axis rotation portion 24 is caused to rotate by 90 degrees, and the tilt axis rotation portion 24 reaches a state in which the tilt axis rotation portion 24 cannot further rotate clockwise. Hereinafter, the tilt axis rotational position of the stage 20 reaching the state is referred to as a perpendicular position of the tilt axis T. Note that, in that state, the detection subject 43 has moved to the detection position of the photo interrupter 48.

As described above, the first tilt axis stopper 44 and the second tilt axis stopper 45 regulate the rotation of the tilt axis rotation portion 24 to thereby mechanically restrict the tilt axis rotational position of the stage 20 to the range between the reference position and the perpendicular position, which prevents the stage 20 from rotating about the tilt axis T outside the range.

In the same manner as in the case of the pan axis P, in this embodiment, during the calibration, the output values of the respective sensors are acquired only in a state in which the tilt axis rotational position of the stage 20 falls in one of the reference position and the perpendicular position. Therefore, the tilt axis motor 40 does not need to be a motor either that can perform such control as to perform the positioning of the tilt axis rotational position of the stage 20 with high precision or cause the stage 20 to rotate about the tilt axis T at a constant speed.

Note that, in the same manner as in the case of the pan axis P, by using the lock control portion 46 to perform the lock control, the positioning of the tilt axis rotational position of the stage 20 can also be performed to 0 degrees (reference position) and 90 degrees (perpendicular position) with sufficiently high precision. Further, in order to prevent a wobble of the tilt axis rotation portion 24, rollers 49a, 49b, and 49c are arranged in three positions along the rim of the tilt axis fixing portion 25.

In this embodiment, unlike the pan axis motor 30 and the tilt axis motor 40, the main shaft motor 11 can perform the positioning control to an arbitrary rotational position, and a target position of the positioning control is decided by a relative rotation angle to an initial position. Meanwhile, the inclination of the electronic device 2 with respect to the vertical direction in which the gravity acts is important in performing the calibration of the acceleration sensor 4. For this reason, the calibration apparatus 1 needs to be able to precisely set the initial position of the roll axis rotational position to a position in which the inclination with respect to the vertical direction is known in advance. Therefore, the calibration apparatus 1 is provided with a mechanism for precisely performing the positioning such that the roll axis rotational position of the stage 20 exhibits an orientation in which the tilt axis T coincides with the vertical direction.

Figure 8:
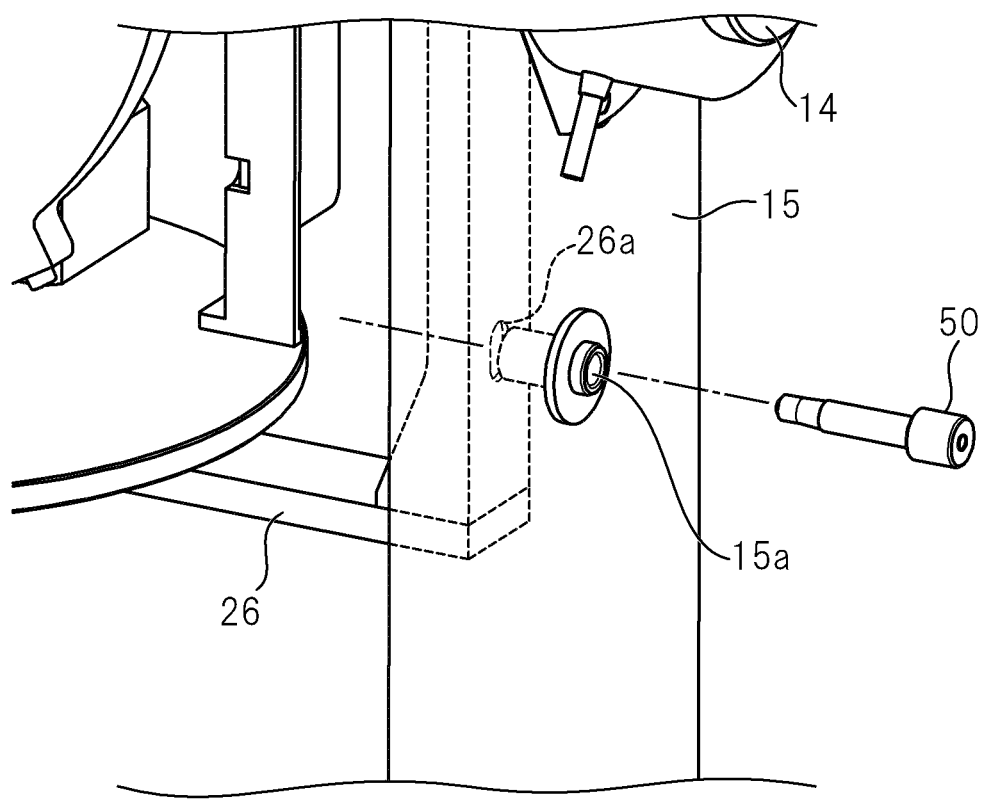
FIG. 8 is a diagram illustrating a method of positioning a roll axis rotational position.

FIG. 8 is a diagram illustrating such a method of positioning the roll axis rotational position. As illustrated in FIG. 8, the through hole 15a is formed in the support portion 15, and a through hole 26a is also formed in the outside arm 26 on the support portion 15 side. Further, those through holes 15a and 26a are formed in such positions as to cause the tilt axis T to coincide with the vertical direction when the through holes 15a and 26a coincide with each other. Therefore, after the stage unit 10 is caused to rotate about the roll axis R to cause the positions of the through holes 15a and 26a to coincide with each other, the positioning of the roll axis rotational position of the stage 20 can be performed by inserting a guide pin 50 having a tapered shape through the through holes 15a and 26a in a state in which the through holes 15a and 26a coincide with each other. However, hereinafter, for the sake of convenience of description, it is assumed that the reference position of the roll axis rotational position is not the initial position determined by the above-mentioned positioning but a position reached by rotating the stage unit 10 by 90 degrees from the initial position (that is, rotational position in which the tilt axis T is parallel with the horizontal plane).

Figure 9A:
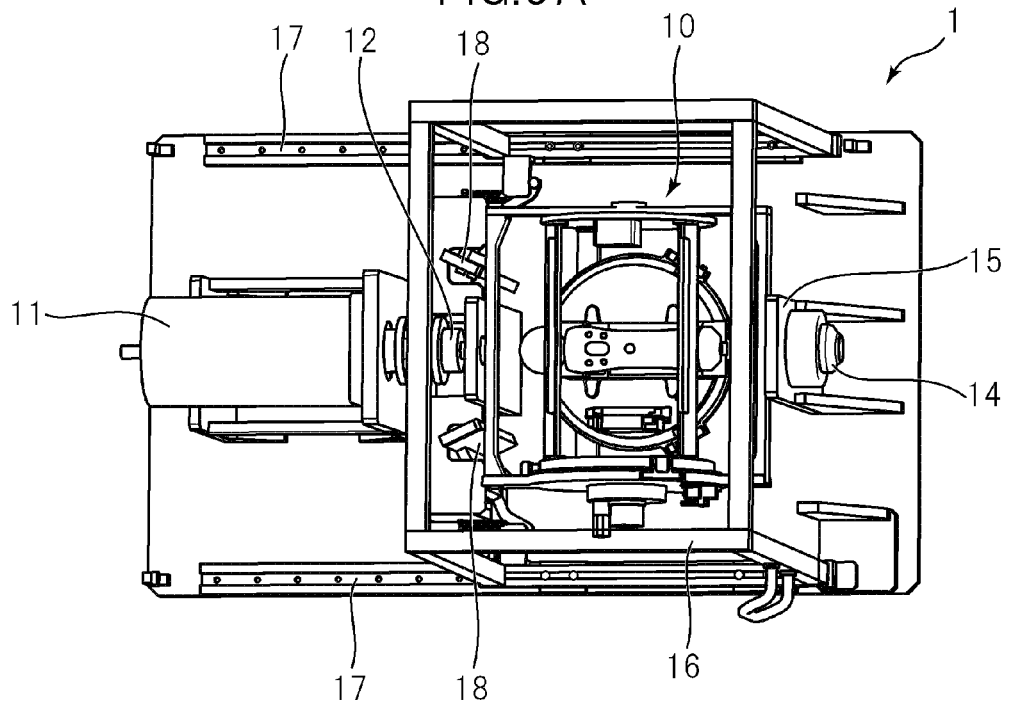
FIG. 9A is a diagram illustrating a state in which a hatch is closed.
Figure 9B:
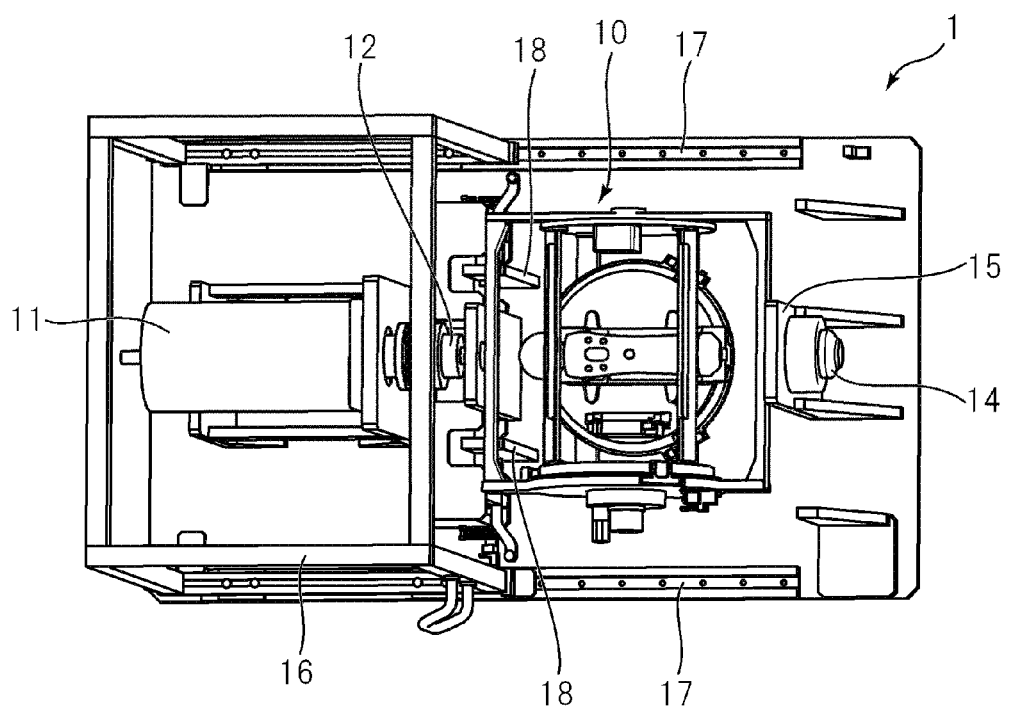
FIG. 9B is a diagram illustrating a state in which the hatch is opened.

Next described is the safety mechanism constituted by the hatch 16, the rails 17, and the lever arms 18. The hatch 16 can move on the rails 17, and plays a role of shielding the stage unit 10 from an external portion when the hatch 16 moves to the stage unit 10 side. FIGS. 9A and 9B are diagrams illustrating the movement of the hatch 16 and perspective views obtained at times when the calibration apparatus 1 is viewed from above. FIG. 9A illustrates a state in which the hatch 16 is closed. Meanwhile, when an operator of the calibration apparatus 1 fixes the electronic device 2 to the stage 20 or removes the electronic device 2 from the stage 20, the operator can access the stage unit 10 by moving the hatch 16 to the main shaft motor 11 side. FIG. 9B illustrates a state in which the hatch 16 is thus opened.

Note that, the hatch 16 is provided with partition walls for shielding the stage unit 10 from the external portion, but in FIGS. 1, 9A, and 9B, the partition walls are drawn as transparent.

Figure 10A:
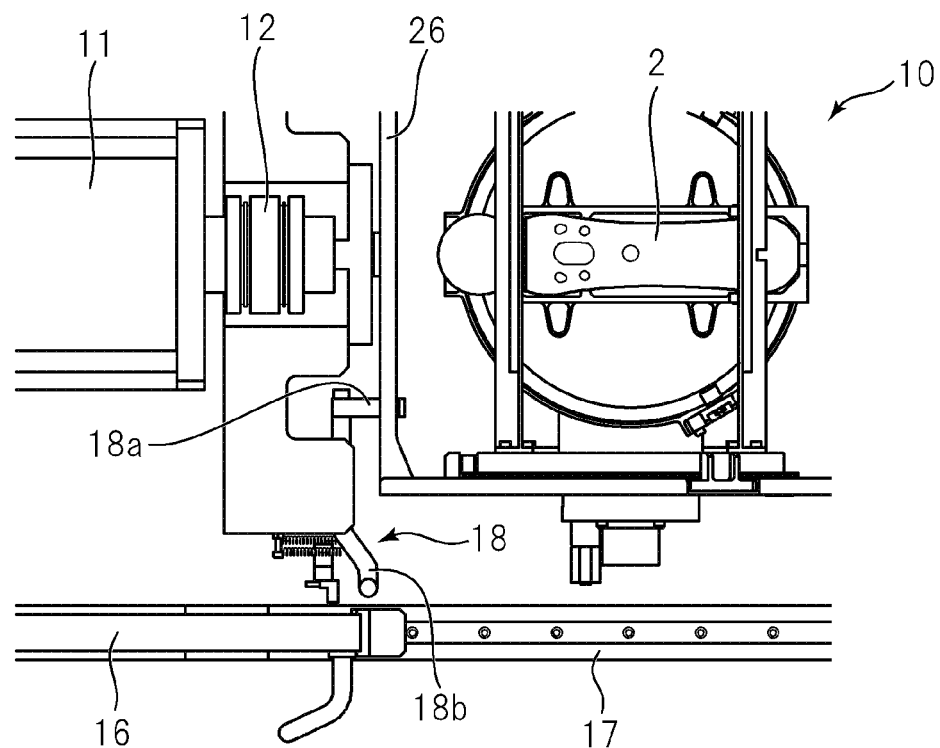
FIG. 10A is a diagram illustrating a position of a lever arm obtained at a time when the hatch is opened.
Figure 10B:
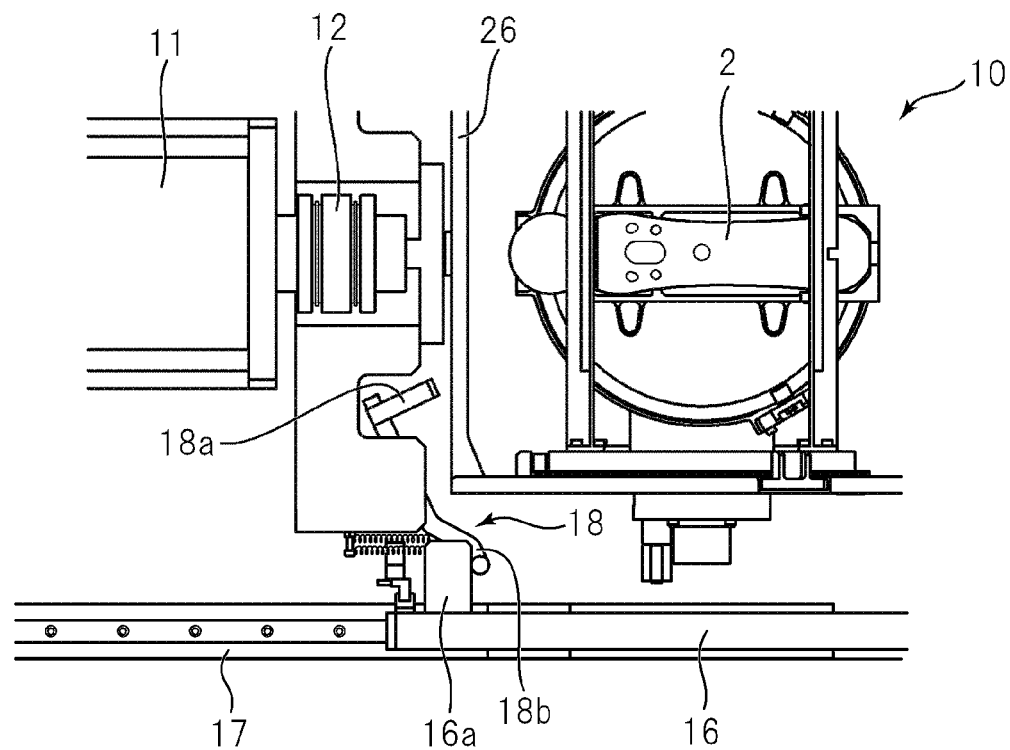
FIG. 10B is a diagram illustrating a position of the lever arm obtained at a time when the hatch is closed.

In addition, in the state in which the hatch 16 is opened, the lever arms 18 jut into the stage unit 10 side to thereby inhibit the rotation of the stage unit 10. FIGS. 10A and 10B are diagrams illustrating how the lever arm 18 operates, each being a partial plan view of the calibration apparatus 1. FIG. 10A illustrates a position of the lever arm 18 obtained at a time when the hatch 16 is opened, and FIG. 10B illustrates the position of the lever arm 18 obtained at a time when the hatch 16 is closed. As illustrated in FIG. 10A, an interfering portion 18a provided at one end of the lever arm 18 juts into the stage unit 10 side, and when the stage unit 10 starts to rotate about the roll axis R, the outside arm 26 on the main shaft motor 11 side interferes with the interfering portion 18a to thereby stop the rotation of the stage unit 10. Note that, the lever arms 18 are arranged on both the left and right sides of the main shaft motor 11, and hence the rotation of the stage unit 10 stops within a half round at maximum whichever direction the stage unit 10 rotates in.

When the hatch 16 is closed, as illustrated in FIG. 10B, a projection portion 16a provided to the hatch 16 pushes forward an end portion 18b of the lever arm 18 on the opposite side of the interfering portion 18a. With this structure, the interfering portion 18a of the lever arm 18 moves backward, and the stage unit 10 no longer interferes with the interfering portion 18a. That is, owing to the action of the lever arm 18, the stage unit 10 can rotate in the state in which the hatch 16 is closed, while in the state in which the hatch 16 is opened, the stage unit 10 cannot rotate.

Note that, the lever arm 18 is urged by a spring (not shown) provided thereto in such a direction as to jut into the stage unit 10 side to inhibit the rotation of the stage unit 10. By an elastic force of the spring, even if the hatch 16 is closed, the hatch 16 is retracted to the main shaft motor 11 side and hence the lever arm 18 inhibits the rotation of the stage unit 10 if nothing is done to the hatch 16. Therefore, to execute the calibration, the operator of the calibration apparatus 1 needs to fix the position of the hatch 16 by a clamp in the state in which the hatch 16 is closed. On the other hand, immediately when the fixing by the clamp is released, the interfering portion 18a of the lever arm 18 juts to stop the rotation of the stage unit 10. Therefore, immediately when, for example, the operator erroneously attempts to open the hatch 16 during the rotation operation of the stage unit 10, the stage unit 10 stops rotating.

Next described are several specific examples of a calibration method for the electronic device 2 which is performed by using the calibration apparatus 1. The calibration method to be described in those specific examples is performed in order to, for example, calculate calibration data reflecting output characteristics of the gyroscopes 3 and the acceleration sensors 4 that are incorporated into the individual electronic devices 2 and write the calibration data to the individual electronic devices 2 when the electronic devices 2 are manufactured.

Figure 11:
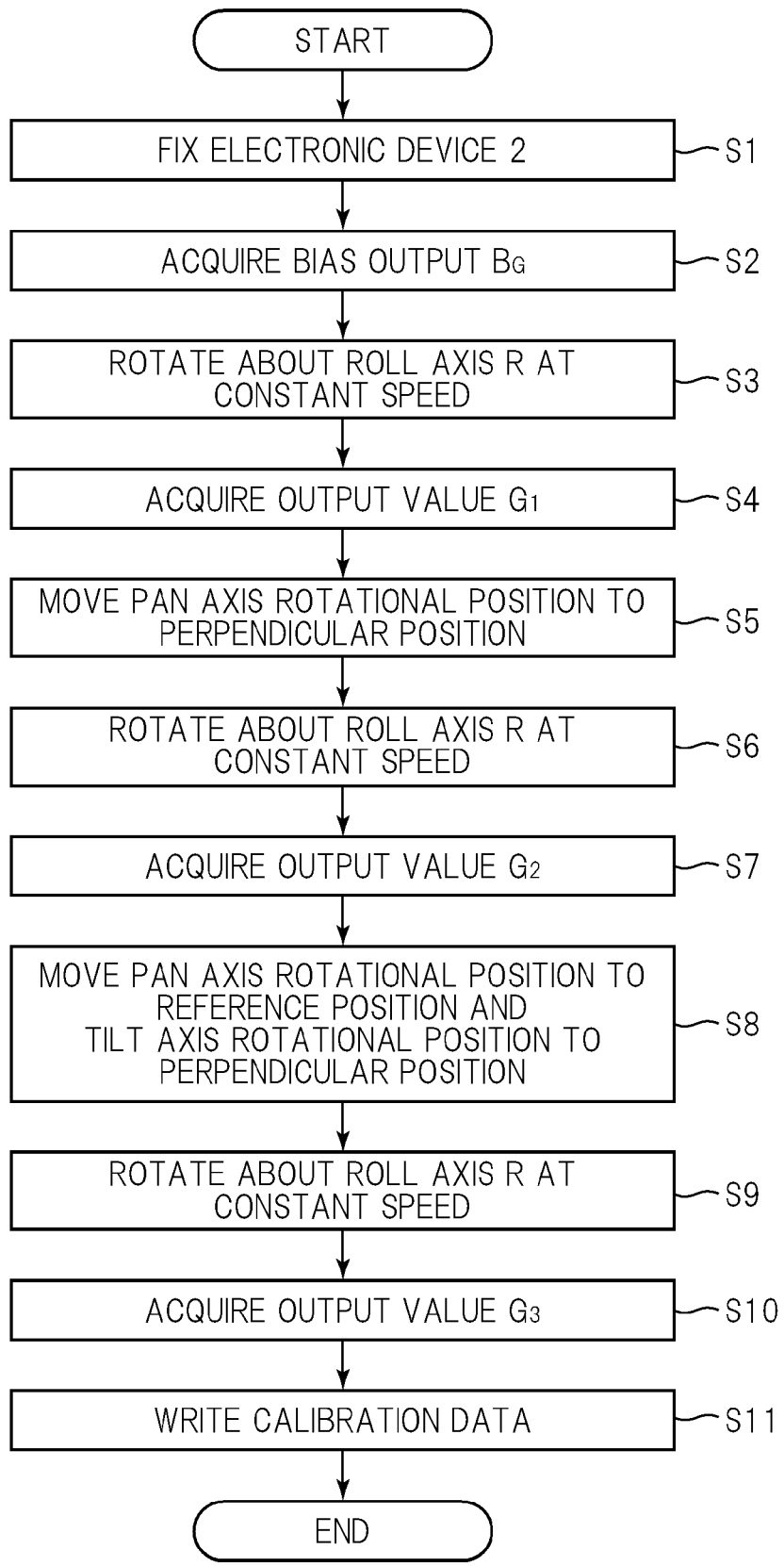
FIG. 11 is a diagram illustrating a procedure for the calibration of a gyroscope.

As a first example, the flowchart of FIG. 11 is referenced to describe a procedure for performing only the calibration processing of the gyroscope 3.

In the calibration of the gyroscope 3, measurement results of the gyroscope 3 are acquired when the electronic device 2 is caused to rotate at a constant speed with each of the three reference axes as the rotation center with a predetermined rotation angular velocity r. Note that, the value of the angular velocity r may be, for example, 540 degrees/second. In the following description, the sensor output values obtained by the gyroscope 3 when the electronic device 2 is caused to rotate at a constant speed with each of an X-axis, a Y-axis, and a Z-axis as the rotation center with the rotation angular velocity r are denoted by $G_1$, $G_2$, and $G_3$. Those output values are each formed of a set of three output values indicating the measurement results in terms of the respective reference axes of the X-axis, the Y-axis, and the Z-axis, and are expressed as follows.

$$G_1 = \begin{pmatrix} g_{1x} \\ g_{1y} \\ g_{1z} \end{pmatrix}, G_2 = \begin{pmatrix} g_{2x} \\ g_{2y} \\ g_{2z} \end{pmatrix}, G_3 = \begin{pmatrix} g_{3x} \\ g_{3y} \\ g_{3z} \end{pmatrix} \quad \text{(Expression 1)}$$

Hereinafter, a specific procedure for the calibration of the gyroscope 3 is described. First, in the state in which the pan axis rotational position and the tilt axis rotational position have been moved to the respective reference positions, the electronic device 2 is fixed to the stage 20 (S1). At this time, the electronic device 2 is fixed to the stage 20 such that sensor reference axes thereof coincide with the rotation axes of the calibration apparatus 1. Hereinafter, as a specific example, it is assumed that the electronic device 2 is placed such that the X-axis, the Y-axis, and the Z-axis of the electronic device 2 coincide with the roll axis R, the tilt axis T, the pan axis P, respectively. Note that, FIGS. 2 and 3 illustrate the state in which the electronic device 2 is thus placed.

In this state, the control device 5 acquires the output values of the gyroscope 3 in terms of the respective reference axes (S2). Those output values are values indicating a bias output (output obtained in a state in which no angular velocity is applied to the respective reference axes). According to a matrix representation, a bias output $B_G$ of the gyroscope 3 is expressed as follows.

$$B_G = \begin{pmatrix} g_{0x} \\ g_{0y} \\ g_{0z} \end{pmatrix} \quad \text{(Expression 2)}$$

Subsequently, the control device 5 issues an instruction to cause the stage unit 10 to rotate about the roll axis R at a constant speed with the predetermined rotation angular velocity r (S3). Therefore, the electronic device 2 is caused to rotate with the X-axis as the rotation center at a constant speed. The control device 5 acquires a sensor output value $G_1$ during the rotation control (S4).

Figure 12A:
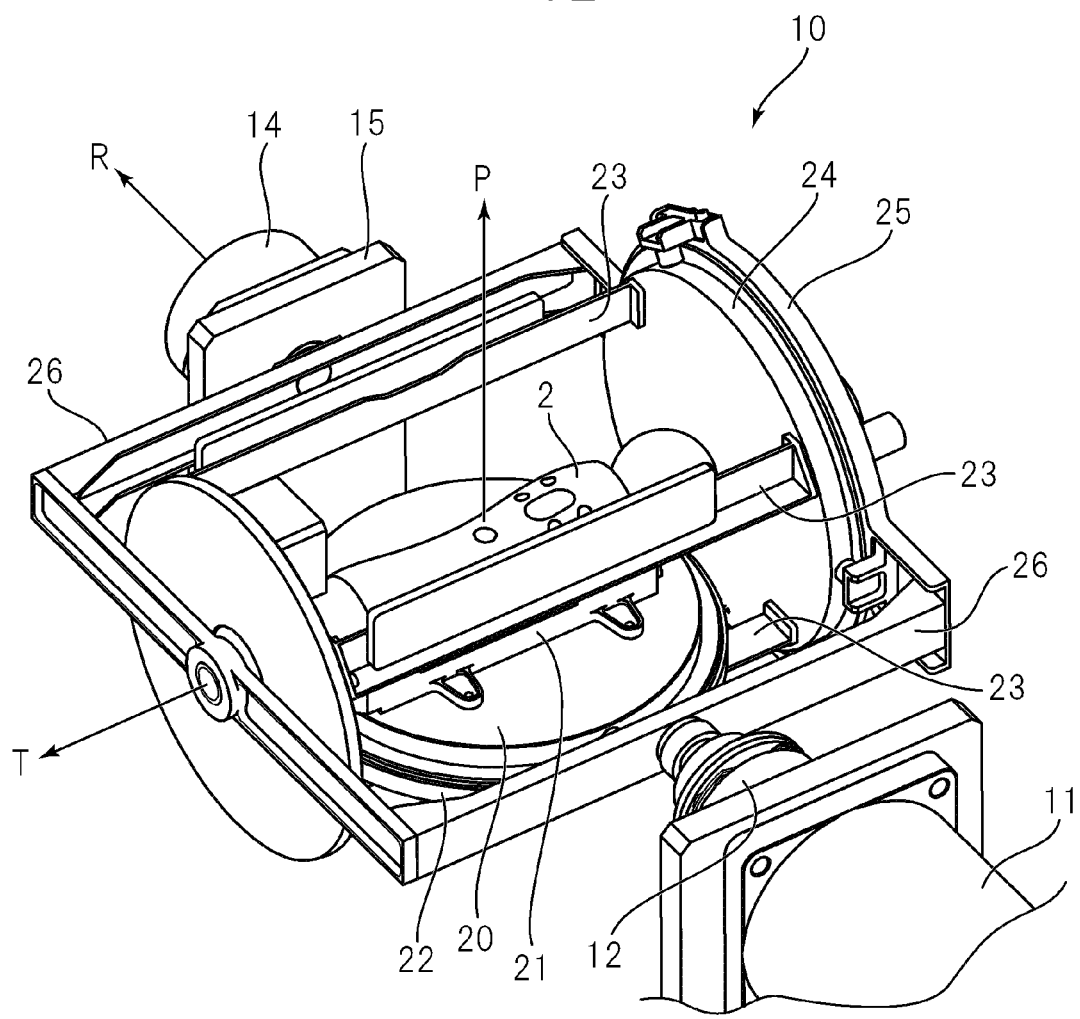
FIG. 12A is a diagram illustrating a state in which a Y-axis of the electronic device coincides with a roll axis.

Subsequently, the control device 5 operates the pan axis motor 30 to move the pan axis rotational position to the perpendicular position (S5). FIG. 12A illustrates the orientation of the electronic device 2 in this state, and as illustrated in FIG. 12A, the Y-axis of the electronic device 2 coincides with the roll axis R in the state. After that, in the same manner as in Step S3, the control device 5 issues an instruction to cause the stage unit 10 to rotate with the predetermined rotation angular velocity r (S6). Therefore, the electronic device 2 is caused to rotate with the Y-axis as the rotation center at a constant speed. The control device 5 acquires a sensor output value $G_2$ during the rotation control (S7).

Figure 12B:
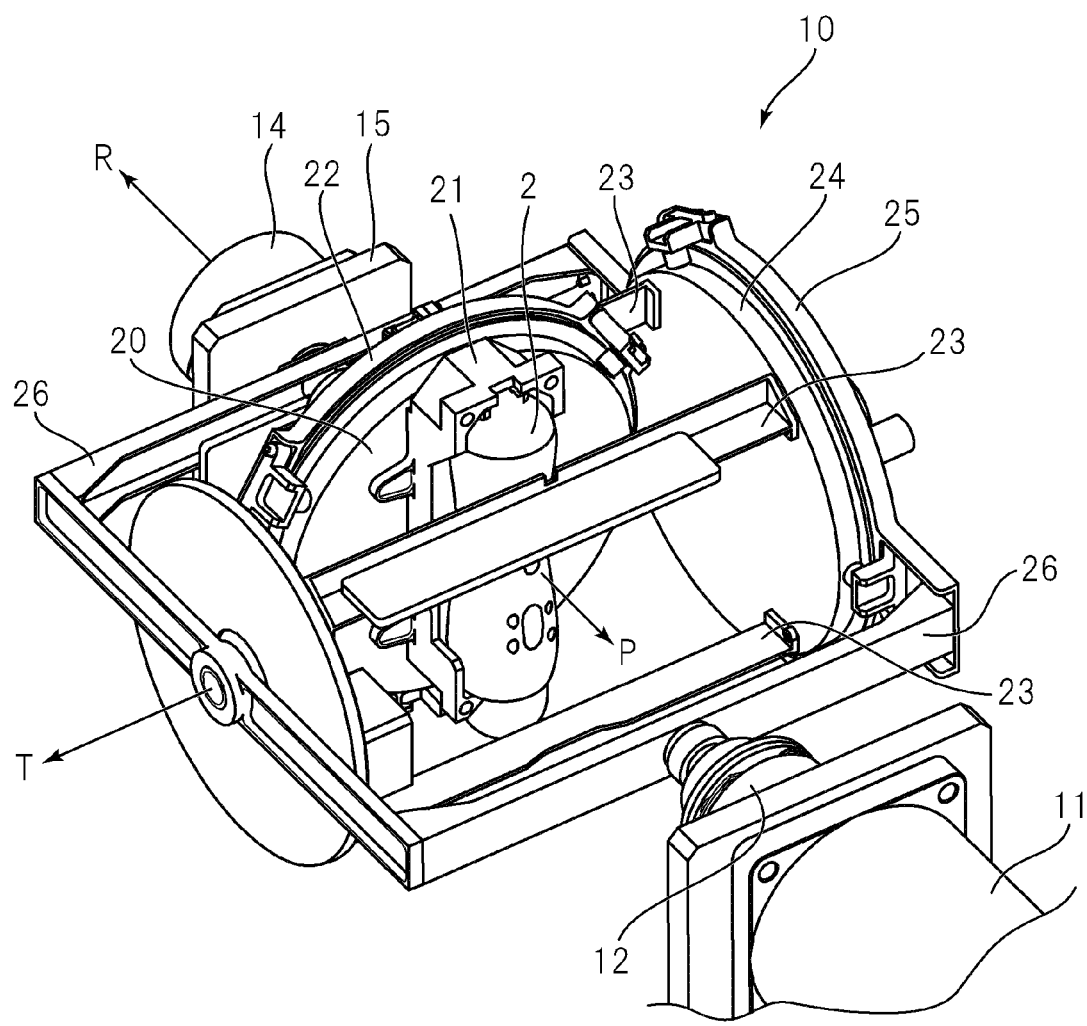
FIG. 12B is a diagram illustrating a state in which a Z-axis of the electronic device coincides with the roll axis.

Subsequently, the control device 5 operates the pan axis motor 30 to return the pan axis rotational position to the reference position, and operates the tilt axis motor 40 to move the tilt axis rotational position to the perpendicular position (S8). FIG. 12B illustrates the orientation of the electronic device 2 in this state, and as illustrated in FIG. 12B, the Z-axis of the electronic device 2 coincides with the roll axis R in the state. After that, in the same manner as in Steps S3 and S6, the control device 5 issues an instruction to cause the stage unit 10 to rotate with the predetermined rotation angular velocity r (S9). Therefore, the electronic device 2 is caused to rotate with the Z-axis as the rotation center at a constant speed. The control device 5 acquires a sensor output value $G_3$ during the rotation control (S10).

The processing described above produces the sensor output values $G_1$ to $G_3$ of the gyroscope 3 which are obtained when the electronic device 2 is caused to rotate with each of the three reference axes of the gyroscope 3 as the rotation center with the predetermined rotation angular velocity r. A sensitivity coefficient (sensor output per unit angular velocity) $S_G$ of the gyroscope 3 is expressed as follows by using those sensor output values according to the matrix representation.

$$S_G = \frac{1}{r}\begin{pmatrix} g_{1x} & g_{2x} & g_{3x} \\ g_{1y} & g_{2y} & g_{3y} \\ g_{1z} & g_{2z} & g_{3z} \end{pmatrix} \quad \text{(Expression 3)}$$

Assuming that the output of the gyroscope 3 is linear, when an arbitrary rotation angular velocity is given to the electronic device 2, the rotation angular velocity of the electronic device 2 can be calculated by using the output values of the gyroscope 3 at that time and the values obtained by the processing described above. Specifically, it is assumed that a sensor output value G of the gyroscope 3 obtained when the rotation with a given angular velocity $V_G$ is caused in the electronic device 2 is expressed as follows.

$$G = \begin{pmatrix} g_x \\ g_y \\ g_z \end{pmatrix} \quad \text{(Expression 4)}$$

In this case, the value of the angular velocity $V_G$ can be calculated by the following expression.

$$V_G = S_G^{-1}(G - B_G) \quad \text{(Expression 5)}$$

Therefore, the control device 5 writes information indicating the sensitivity coefficient and the bias output of the gyroscope 3 obtained by the processing described above as the calibration data to the nonvolatile memory within the electronic device 2 (S11). This completes the calibration processing of the gyroscope 3. Such calibration processing is performed on each of the mass-produced electronic devices 2, for example, at the time of manufacturing the electronic device 2 (that is, before factory shipment thereof). Accordingly, each of the electronic devices 2 to be shipped can obtain the measurement results of the angular velocity corrected in consideration of the output characteristic of the gyroscope 3 incorporated thereinto by using the calibration data written in Step S11.

As described above, even if the pan axis motor 30 and the tilt axis motor 40 themselves cannot precisely perform the control of the rotational speed, the calibration apparatus 1 according to this embodiment can perform the rotation control at the constant rotational speed with each of the three sensor reference axes of the electronic device 2 as the rotation center once the electronic device 2 is fixed to the stage 20 without the need to manually change the orientation of the electronic device 2 with respect to the stage 20 again to fix the electronic device 2 to the stage 20 again.

Note that, in the above-mentioned example, the sensor output values are acquired when the constant speed rotation is performed with one rotation angular velocity r in terms of the respective sensor reference axes, but the electronic device 2 may be caused to rotate at a constant speed rotation with, for example, each value of a plurality of rotation angular velocities, and the sensor output values at that time may be acquired. With this configuration, the calibration can be performed with higher precision. Further, in order to correct a temperature drift of the sensor, the output values of the sensor may be acquired by subjecting the electronic device 2 to the constant speed rotation a plurality of times under circumstances with different temperatures of the sensor. Further, in the above description, the sensor output values $G_1$ to $G_3$ are acquired in the stated order, but the acquisition order is merely an example, and the respective output values may be acquired in an order different therefrom.

Next, as a second example, a procedure for performing only the calibration processing of the acceleration sensor 4 is described with reference to the flowchart of FIG. 13. Note that, for the sake of convenience of description, in the following, it is assumed that the respective rotational positions of the roll axis R, the tilt axis T, and the pan axis P of the stage 20 are represented by a set of three numerals each indicating a rotation angle from the reference position of each axis to a predetermined direction. For example, a state in which the rotational positions of all the rotation axes that fall in the reference positions are represented by (0, 0, 0). Further, a state in which the roll axis rotational position and the tilt axis rotational position each fall in the reference position and the pan axis rotational position falls in the perpendicular position is represented by (0, 0, 90). A state in which the roll axis rotational position and the pan axis rotational position each fall in the reference position and the tilt axis rotational position falls in the perpendicular position is represented by (0, 90, 0). Note that, here, a direction of rotating clockwise when viewed from the main shaft motor 11 side is assumed as a positive direction of the rotation about the roll axis.

In the calibration of the acceleration sensor 4, in order to accurately detect a magnitude of the gravitational acceleration that acts upon the electronic device 2, the sensor output values are acquired in states in which the gravitational accelerations of +1g and −1g are applied to each of the three reference axes of the acceleration sensor 4. Here, g represents the gravitational acceleration, generally assuming a value of 9. 8 m/s². That is, in the calibration of the acceleration sensor 4, the output values of the acceleration sensor 4 are acquired in the states in which the positive and negative directions of the three reference axes (that is, six directions in total) coincide with the vertical direction. Hereinafter, the sensor output values of the acceleration sensor 4 acquired in the states in which a negative X-axis direction, a positive X-axis direction, a negative Y-axis direction, a positive Y-axis direction, a negative Z-axis direction, and a positive Z-axis direction coincide with the vertical direction are represented by $A_1$, $A_2$, $A_3$, $A_4$, $A_5$, and $A_6$, respectively. Those sensor output values are each formed of a set of three output values indicating the accelerations generated in terms of the X-axis, the Y-axis, and the Z-axis, and are expressed as follows.

$$A_1 = \begin{pmatrix} a_{1x} \\ a_{1y} \\ a_{1z} \end{pmatrix}, A_2 = \begin{pmatrix} a_{2x} \\ a_{2y} \\ a_{2z} \end{pmatrix}, A_3 = \begin{pmatrix} a_{3x} \\ a_{3y} \\ a_{3z} \end{pmatrix}, \quad \text{(Expression 6)}$$

$$A_4 = \begin{pmatrix} a_{4x} \\ a_{4y} \\ a_{4z} \end{pmatrix}, A_5 = \begin{pmatrix} a_{5x} \\ a_{5y} \\ a_{5z} \end{pmatrix}, A_6 = \begin{pmatrix} a_{6x} \\ a_{6y} \\ a_{6z} \end{pmatrix}$$

Hereinafter, a specific procedure for the calibration of the acceleration sensor 4 is described. First, the electronic device 2 is fixed to the stage 20, and the rotational position of the stage 20 is positioned to a state of (0, 0, 0) (S21). Note that, here, it is assumed that, in a state in which the rotational position of the stage 20 is positioned to the state of (0, 0, 0), the electronic device 2 is fixed to the stage 20 such that the X-axis, the Y-axis, and the Z-axis of the electronic device 2 coincide with the roll axis R, the tilt axis T, and the pan axis P, respectively. Note that, FIGS. 2 and 3 illustrate the state in which the electronic device 2 is thus placed. In this state, the gravitational acceleration of −1g is applied to the Z-axis. Then, the control device 5 acquires a sensor output value $A_6$ at this time (S22).

Subsequently, the control device 5 causes the main shaft motor 11 to rotate the stage unit 10, and positions the stage 20 to a state of (180, 0, 0) (S23). In the state, the gravitational acceleration of +1g is applied to the Z-axis. The control device 5 acquires a sensor output value $A_5$ at this time (S24).

Subsequently, the control device 5 positions the stage 20 to a state of (90, 0, 0) (S25), and acquires a sensor output value $A_4$ (S26). At this time, the gravitational acceleration of −1g is applied to the Y-axis. In addition, the control device 5 positions the stage 20 to a state of (−90, 0, 0) (S27), and acquires a sensor output value $A_3$ (S28). At this time, the gravitational acceleration of +1g is applied to the Y-axis. Therefore, by the positioning control using the main shaft motor 11, the control device 5 can acquire the sensor output values in a case where the positive and negative directions of the Y-axis and the Z-axis that are perpendicular to each other in the same plane are respectively set as the vertical direction.

After that, the control device 5 causes the main shaft motor 11 to return the roll axis rotational position to the reference position and causes the tilt axis motor 40 to shift the tilt axis rotational position to the perpendicular position, thereby positioning the stage 20 to (0, 90, 0) (S29). In this state, the gravitational acceleration of +1g is applied to the X-axis. The control device 5 acquires a sensor output value $A_1$ at this time (S30). In addition, the control device 5 causes the main shaft motor 11 to rotate the stage unit 10 by a half round, and positions the stage 20 to a state of (180, 90, 0) (S31). In this state, the gravitational acceleration of −1g is applied to the X-axis. The control device 5 acquires a sensor output value $A_2$ at this time (S32). Therefore, by shifting the tilt axis rotational position to the perpendicular position, the control device 5 can also acquire the sensor output values in the case where the positive/negative X-axis directions are respectively set as the vertical direction.

By using the sensor output values $A_1$ to $A_6$ of the acceleration sensor 4 acquired by the processing described above, it is possible to calculate a bias output (output obtained in a state in which no acceleration is applied) $B_A$ and a sensitivity coefficient (sensor output per unit acceleration) $S_A$ of the acceleration sensor 4. Specifically, the bias output $B_A$ is calculated as follows.

$$B_A = \begin{pmatrix} \frac{(a_{1x} + a_{2x})}{2} \\ \frac{(a_{3y} + a_{4y})}{2} \\ \frac{(a_{5z} + a_{6z})}{2} \end{pmatrix} \quad \text{(Expression 7)}$$

Further, the sensitivity coefficient $S_A$ is calculated as follows.

$$S_A = \frac{1}{g} \begin{pmatrix} \frac{(a_{1x} - a_{2x})}{2} & \frac{(a_{3x} - a_{4x})}{2} & \frac{(a_{5x} - a_{6x})}{2} \\ \frac{(a_{1y} - a_{2y})}{2} & \frac{(a_{3y} - a_{4y})}{2} & \frac{(a_{5y} - a_{6y})}{2} \\ \frac{(a_{1z} - a_{2z})}{2} & \frac{(a_{3z} - a_{4z})}{2} & \frac{(a_{5z} - a_{6z})}{2} \end{pmatrix} \quad \text{(Expression 8)}$$

Assuming that the output of the acceleration sensor 4 is linear, when an arbitrary acceleration is given to the electronic device 2, the acceleration applied to the electronic device 2 can be calculated by using the output values of the acceleration sensor 4 at that time and the values obtained by the processing described above. Specifically, it is assumed that the sensor output value A of the acceleration sensor 4 obtained when a given acceleration $V_A$ is applied is expressed as follows.

$$A = \begin{pmatrix} a_x \\ a_y \\ a_z \end{pmatrix} \quad \text{(Expression 9)}$$

In this case, the value of the acceleration $V_A$ can be calculated by the following expression.

$$V_A = S_A^{-1}(A - B_A) \quad \text{(Expression 10)}$$

Therefore, the control device 5 writes information indicating the sensitivity coefficient and the bias output of the acceleration sensor 4 acquired by the processing described above as the calibration data to the nonvolatile memory within the electronic device 2 (S33). This completes the calibration processing of the acceleration sensor 4.

As apparent from the above description, as long as the main shaft motor 11 can perform the positioning to four rotational positions of 0 degrees, 90 degrees, −90 degrees, and 180 degrees and the positioning to two rotational positions of 0 degrees of 90 degrees in terms of the rotation axis (tilt axis T) perpendicular to the rotation axis (roll axis R) of the main shaft motor 11, it is possible to acquire information necessary for the calibration of the three-axis acceleration sensor 4. Therefore, the mechanism for the rotation about the pan axis P is unnecessary if only the calibration of the acceleration sensor 4 is performed. Note that, in this embodiment, the rotation axis of the main shaft motor 11 is perpendicular to the vertical direction, which allows such positioning control as to cause each of the sensor reference axes to coincide with the vertical direction by using the main shaft motor 11.

Note that, the control device 5 may improve the precision of the calibration by, for example, calculating the bias output by using a method of least squares in addition to performing the calculation method described above. Further, in order to correct the temperature drift of the sensor, the measurement of the sensor output described above may be performed a plurality of times or more often under circumstances with different temperatures of the sensor. Further, the acquisition order of the respective sensor output values in the above description is merely an example, and the sensor output values may be acquired in an order different therefrom.

Next, as a third example, a procedure for performing both the calibrations of the gyroscope 3 and the acceleration sensor 4 is described with reference to the flowcharts of FIGS. 14A and 14B.

In a case where both the calibrations of the gyroscope 3 and the acceleration sensor 4 are necessary, for example, the above-mentioned control of the flow of FIG. 11 and the above-mentioned control of the flow of FIG. 13 may be executed in order independently of each other. However, a fixed amount of time is necessary for the rotation and the positioning of the stage 20, and hence it is desired that the calibration processing be performed by such a procedure as to lower the amount of change in the posture of the stage 20 in order to reduce the time for the calibration. Therefore, as exemplified below, by performing the rotation at a constant speed while the orientation of the stage 20 is being changed in order to acquire the output values necessary for the calibration of the acceleration sensor 4, and by acquiring the output values of the gyroscope 3 during that time, it is possible to simplify the procedure for the calibration and achieve reduction in time therefor.

Specifically, first, in the same manner as in the case of the flow of FIG. 13, the rotational position of the stage 20 is set in the state of (0, 0, 0), and the electronic device 2 is fixed to the stage 20 such that the sensor reference axis coincides with the rotation axis of the calibration apparatus 1 (S41). Then, the sensor output value $A_6$ of the acceleration sensor 4 and the bias output $B_G$ of the gyroscope 3 at this time are acquired (S42).

Subsequently, the control device 5 positions the stage 20 to (90, 0, 0) (S43), and acquires the sensor output value $A_4$ of the acceleration sensor 4 (S44). In addition, the control device 5 positions the stage 20 to (180, 0, 0) (S45), and acquires the sensor output value $A_5$ of the acceleration sensor 4 (S46). Subsequently, the control device 5 positions the stage 20 to (−90, 0, 0) (S47), and acquires the sensor output value $A_3$ of the acceleration sensor 4 (S48). The positioning control performed so far can be realized by causing the stage 20 to keep rotating about the roll axis R in the same rotation direction.

After that, the control device 5 causes the roll axis R to rotate with the predetermined rotation angular velocity r (S49). At this time, the roll axis R coincides with the X-axis of the electronic device 2, and hence the sensor output value $G_1$ can be obtained by sampling the outputs of the gyroscope 3 that is rotating (S50).

Subsequently, the control device 5 positions the stage 20 to (0, 0, 90) (S51). At this time, the Y-axis of the electronic device 2 coincides with the roll axis R. Then, in the same manner as in Steps S49 and S50, the control device 5 causes the roll axis R to rotate with the predetermined rotation angular velocity r (S52), and acquires the sensor output value $G_2$ of the gyroscope 3 that is rotating (S53).

Subsequently, the control device 5 positions the stage 20 to (0, 90, 0) (S54), and acquires the sensor output value $A_1$ of the acceleration sensor 4 (S55). In addition, the control device 5 positions the stage 20 to (180, 90, 0) (S56), and acquires the sensor output value $A_2$ of the acceleration sensor 4 (S57). After that, the control device 5 causes the roll axis R to rotate with the predetermined rotation angular velocity r (S58). At this time, the Z-axis of the electronic device 2 coincides with the roll axis R. The control device 5 acquires the sensor output value $G_3$ of the gyroscope 3 that is rotating (S59).

By the procedure described above, the sensor output values $G_1$ to $G_3$ necessary to generate data on the calibration of the gyroscope 3 and the sensor output values $A_1$ to $A_6$ necessary to generate data on the calibration of the acceleration sensor 4 are acquired. Therefore, the control device 5 calculates the calibration data by the above-mentioned expressions, and writes the calibration data to the nonvolatile memory of the electronic device 2 (S60). This completes the electronic device 2 to which the calibration data reflecting the output characteristics of the gyroscope 3 and the acceleration sensor 4 that are incorporated thereinto is written.

According to the calibration apparatus 1 of this embodiment described above, the pan axis motor 30 and the tilt axis motor 40 does not need to have the function of the positioning control or the constant speed rotation control, and only need to perform the positioning to each reference position and each perpendicular position, which eliminates the need to rotate the stage 20 at high speed. Therefore, those motors can be downsized. Further, if the pan axis motor 30 and the tilt axis motor 40 can be downsized, the entire stage unit 10 can be further reduced in weight. Therefore, the motor having a lower torque than a conventional one can also be employed as the main shaft motor 11 that performs the positioning control and the constant speed rotation control of the stage unit 10.

Note that, the embodiment of the present invention is not limited to the above-mentioned embodiment. For example, in a case where the gyroscope 3 to be subjected to the calibration is a two-axis gyroscope, the calibration apparatus 1 does not need to be provided with the mechanism for the rotation about a pan axis, and if the tilt axis rotational position can be positioned to the reference position and the perpendicular position and if the constant speed rotation control about the roll axis R is possible, the constant speed rotation control in terms of the two respective axes can be performed.

Further, in the above description, the electronic device 2 is fixed to a stage having a disc-like shape, but the component for fixing the electronic device 2 is not limited to one having such a shape, and may be a holder having any kind of shape for holding the electronic device 2.

Further, in the above description, in order to fix the stage 20 and the tilt axis rotation portion 24 in the reference position and the perpendicular position, a lock mechanism provided with a key fitted into a key groove is employed, but the present invention is not limited thereto, and the stage 20 and the tilt axis rotation portion 24 may be fixed by, for example, a guide pin, a plunger, or other such mechanisms.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A calibration apparatus for calibrating a sensor of an electronic device, the sensor for detecting rotation of the electronic device in three-dimensional space and the sensor including orthogonal R-axis, P-axis, and T-axis directions, the calibration apparatus comprising:

a holder defining orthogonal X-axis, Y-axis, and Z-axis directions for the holder;

a first motor for causing the holder to rotate at a predetermined rotational speed about a predetermined rotation axis;

a second motor for causing the holder to rotate about the Y-axis;

a Y-axis stopper for restricting a rotational position of the holder between a Y-axis reference position, a positive Y-axis perpendicular position positive 90 degrees from the Y-axis reference position about the Y-axis, and a negative Y-axis perpendicular position negative 90 degrees from the Y-axis reference position about the Y-axis, a third motor for causing the holder to rotate about the Z-axis;

a Z-axis stopper restricting a rotational position of the holder between a Z-axis reference position, a positive Z-axis perpendicular position positive 90 degrees from the Z-axis reference position about the Z-axis, and a negative Z-axis perpendicular position negative 90 degrees from the Z-axis reference position about the Z-axis, wherein:

the holder is operable to receive and retain the electronic device such that: (i) the R-axis of the sensor of the electronic device is coaxial with the X-axis of the holder, (ii) the P-axis of the sensor of the electronic device is coaxial with the Y-axis of the holder, and (iii) the T-axis of the sensor of the electronic device is coaxial with the Z-axis of the holder, the second motor, the third motor, the Y-axis stopper and the Z-axis stopper cause the holder rotate such that: (i) the holder is at the Y-axis reference position about the Y-axis, (ii) the holder is at the Z-axis reference position about the Z-axis, (iii) the X-axis is coaxial with the predetermined rotation axis, and (iv) the first motor causes the holder to rotate about the X-axis, and the sensor of the electronic device to rotate about the R-axis, at the predetermined rotational speed to obtain first output values from the sensor, the second motor, the third motor, the Y-axis stopper and the Z-axis stopper cause the holder rotate such that: (i) the holder is at the Y-axis perpendicular position about the Y-axis, (ii) the holder is at the Z-axis reference position about the Z-axis, (iii) the Z-axis is coaxial with the predetermined rotation axis, and (iv) the first motor causes the holder to rotate about the Z-axis, and the sensor of the electronic device to rotate about the T-axis, at the predetermined rotational speed to obtain second output values from the sensor, and the second motor, the third motor, the Y-axis stopper and the Z-axis stopper cause the holder rotate such that: (i) the holder is at the Y-axis reference position about the Y-axis, (ii) the holder is at the Z-axis perpendicular position about the Z-axis, (iii) the Y-axis is coaxial with the predetermined rotation axis, and (iv) the first motor causes the holder to rotate about the Y-axis, and the sensor of the electronic device to rotate about the P-axis, at the predetermined rotational speed to obtain third output values from the sensor.

2. The calibration apparatus according to claim 1, further comprising a lock control portion operating to prevent the holder from rotating about the Y-axis when the rotational position of the holder is in the Y-axis reference position and in the Y-axis perpendicular position.

3. The calibration apparatus according to claim 1, wherein:
  the electronic device further comprises an acceleration sensor for detecting a magnitude of a gravitational acceleration applied thereto;
  when the second motor, the third motor, the Y-axis stopper and the Z-axis stopper cause the holder rotate such that the X-axis is coaxial with the predetermined rotation axis, the first motor causes: (i) the holder to rotate such that the Y-axis is vertical and axially aligned with a gravitational force to take a positive P-axis gravitational reading from the acceleration sensor, and (ii) the holder to rotate 180 degrees to take a negative P-axis gravitational reading from the acceleration sensor;
  when the second motor, the third motor, the Y-axis stopper and the Z-axis stopper cause the holder rotate such that the Z-axis is coaxial with the predetermined rotation axis, the first motor causes: (i) the holder to rotate such that the X-axis is vertical and axially aligned with a gravitational force to take a positive R-axis gravitational reading from the acceleration sensor, and (ii) the holder to rotate 180 degrees to take a negative R-axis gravitational reading from the acceleration sensor; and
  when the second motor, the third motor, the Y-axis stopper and the Z-axis stopper cause the holder rotate such that the Y-axis is coaxial with the predetermined rotation axis, the first motor causes: (i) the holder to rotate such that the Z-axis is vertical and axially aligned with a gravitational force to take a positive T-axis gravitational reading from the acceleration sensor, and (ii) the holder to rotate 180 degrees to take a negative T-axis gravitational reading from the acceleration sensor.

4. A calibration method for calibrating a sensor of an electronic device, the sensor for detecting rotation of the electronic device in three-dimensional space and the sensor including orthogonal R-axis, P-axis, and T-axis directions, the calibration method comprising:
  providing a holder having orthogonal X-axis, Y-axis, and Z-axis directions;
  providing a first motor for causing the holder to rotate at a predetermined rotational speed about a predetermined rotation axis;
  providing a second motor for causing the holder to rotate about the Y-axis;
  providing a Y-axis stopper for restricting a rotational position of the holder between a Y-axis reference position, a positive Y-axis perpendicular position positive 90 degrees from the Y-axis reference position about the Y-axis, and a negative Y-axis perpendicular position negative 90 degrees from the Y-axis reference position about the Y-axis, providing a third motor for causing the holder to rotate about the Z-axis;
  providing a Z-axis stopper restricting a rotational position of the holder between a Z-axis reference position, a positive Z-axis perpendicular position positive 90 degrees from the Z-axis reference position about the Z-axis, and a negative Z-axis perpendicular position negative 90 degrees from the Z-axis reference position about the Z-axis;
  fixing the electronic device to the holder such that: (i) the R-axis of the sensor of the electronic device is coaxial with the X-axis of the holder, (ii) the P-axis of the sensor of the electronic device is coaxial with the Y-axis of the holder, and (iii) the T-axis of the sensor of the electronic device is coaxial with the Z-axis of the holder;
  causing the second motor, the third motor, the Y-axis stopper and the Z-axis stopper to rotate the holder such that: (i) the holder is at the Y-axis reference position about the Y-axis, (ii) the holder is at the Z-axis reference position about the Z-axis, (iii) the X-axis is coaxial with the predetermined rotation axis, and (iv) the first motor causes the holder to rotate about the X-axis, and the sensor of the electronic device to rotate about the R-axis, at the predetermined rotational speed to obtain first output values from the sensor;
  causing the second motor, the third motor, the Y-axis stopper and the Z-axis stopper to rotate the holder such that: (i) the holder is at the Y-axis perpendicular position about the Y-axis, (ii) the holder is at the Z-axis reference position about the Z-axis, (iii) the Z-axis is coaxial with the predetermined rotation axis, and (iv) the first motor causes the holder to rotate about the Z-axis, and the sensor of the electronic device to rotate about the T-axis, at the predetermined rotational speed to obtain second output values from the sensor; and
  causing the second motor, the third motor, the Y-axis stopper and the Z-axis stopper to rotate the holder such that: (i) the holder is at the Y-axis reference position about the Y-axis, (ii) the holder is at the Z-axis perpendicular position about the Z-axis, (iii) the Y-axis is coaxial with the predetermined rotation axis, and (iv) the first motor causes the holder to rotate about the Y-axis, and the sensor of the electronic device to rotate about the P-axis, at the predetermined rotational speed to obtain third output values from the sensor.

5. The method of claim 4, further comprising writing calibration data calculated from the first, second and third output values to a nonvolatile memory of the electronic device.

6. The method of claim 4, further comprising locking the holder from rotating about the Y-axis when the rotational position of the holder is in the Y-axis reference position and in the Y-axis perpendicular position.

7. The method of claim 4, further comprising locking the holder from rotating about the Z-axis when the rotational position of the holder is in the Z-axis reference position and in the Z-axis perpendicular position.

8. The method of claim 4, wherein the electronic device further comprises an acceleration sensor for detecting a magnitude of a gravitational acceleration applied thereto, the method further comprising:
  when the second motor, the third motor, the Y-axis stopper and the Z-axis stopper cause the holder rotate such that the X-axis is coaxial with the predetermined rotation axis, the first motor causes: (i) the holder to rotate such that the Y-axis is vertical and axially aligned with a gravitational force to take a positive P-axis gravitational reading from the acceleration sensor, and (ii) the holder to rotate 180 degrees to take a negative P-axis gravitational reading from the acceleration sensor;
  when the second motor, the third motor, the Y-axis stopper and the Z-axis stopper cause the holder rotate such that the Z-axis is coaxial with the predetermined rotation axis, the first motor causes: (i) the holder to rotate such that the X-axis is vertical and axially aligned with a gravitational force to take a positive R-axis gravitational reading from the acceleration sensor, and (ii) the holder to rotate 180 degrees to take a negative R-axis gravitational reading from the acceleration sensor; and
  when the second motor, the third motor, the Y-axis stopper and the Z-axis stopper cause the holder rotate such that the Y-axis is coaxial with the predetermined rotation axis, the first motor causes: (i) the holder to rotate such that the Z-axis is vertical and axially aligned with a gravitational force to take a positive T-axis gravitational reading from the acceleration sensor, and (ii) the holder to rotate 180 degrees to take a negative T-axis gravitational reading from the acceleration sensor.

* * * * *